US012547586B1

(12) United States Patent
Krause

(10) Patent No.: US 12,547,586 B1
(45) Date of Patent: Feb. 10, 2026

(54) DATA CONVERSION, DATA ENTRY AND ANALYTICS SYSTEM AND METHOD FOR A CONSTRUCTION PROJECT TO BE BUILT IN AUTOMATION

(71) Applicant: Richard A Krause, Arlington Heights, IL (US)

(72) Inventor: Richard A Krause, Arlington Heights, IL (US)

( * ) Notice: Subject to any disclaimer, the term of this patent is extended or adjusted under 35 U.S.C. 154(b) by 0 days.

(21) Appl. No.: 18/777,188

(22) Filed: Jul. 18, 2024

Related U.S. Application Data

(63) Continuation-in-part of application No. 17/590,487, filed on Feb. 1, 2022, now Pat. No. 12,271,850, and a continuation-in-part of application No. 17/533,992, filed on Nov. 23, 2021, now Pat. No. 12,271,753, and a continuation-in-part of application No. 17/534,023, filed on Nov. 23, 2021, now Pat. No. 12,271,964, and a continuation-in-part of application No. 17/517,191, filed on Nov. 2, 2021, now Pat. No. 12,223,542, and a continuation-in-part of application No. 17/508,277, filed on Oct. 22, 2021, now Pat. No. 12,118,631, and a continuation-in-part of application No. 17/492,246, filed on Oct. 1, 2021, now Pat. No. 12,260,155.

(51) Int. Cl.
| | |
|---|---|
| *G06F 16/10* | (2019.01) |
| *G06F 16/11* | (2019.01) |
| *G06F 30/13* | (2020.01) |
| *G06Q 10/0631* | (2023.01) |
| *G06Q 10/10* | (2023.01) |
| *G06Q 40/12* | (2023.01) |

(52) U.S. Cl.
CPC ............ *G06F 16/116* (2019.01); *G06F 30/13* (2020.01); *G06Q 10/06316* (2013.01); *G06Q 10/103* (2013.01); *G06Q 40/12* (2013.12)

(58) Field of Classification Search
CPC . G06F 16/116; G06F 30/13; G06Q 10/06316; G06Q 10/103; G06Q 40/12
See application file for complete search history.

(56) References Cited

U.S. PATENT DOCUMENTS

| | | |
|---|---|---|
| 10,593,104 B2 | 3/2020 | Robert et al. |
| 10,831,944 B1 | 11/2020 | Giattina |
| 2006/0015475 A1 | 1/2006 | Birkner et al. |

(Continued)

*Primary Examiner* — Diedra McQuitery
(74) *Attorney, Agent, or Firm* — Christopher J. Scott

(57) ABSTRACT

A data entry and analytics system is configured to receive and vet digital project design data and support construction automation processes. The overall system includes a centralized data entry and analytics component configured to receive digital project design data for a project design from at least one upstream source; analyze the digital project design data to determine whether the data competently supports a complete construction of the project design in an automated manner; provide a mechanism for updating the digital project design data so as to ensure the data competently supports the project design and an automated complete construction thereof; and communicate the digital project design data as vetted to downstream components for enabling and competently supporting completion of the project design and the automated complete construction thereof. Certain analogous methodology is further disclosed.

19 Claims, 6 Drawing Sheets

(56) References Cited

U.S. PATENT DOCUMENTS

| | | | |
|---|---|---|---|
| 2012/0215500 A1* | 8/2012 | Ciuti | G06F 30/13 |
| | | | 703/1 |
| 2017/0278037 A1 | 9/2017 | Petterson et al. | |
| 2018/0174250 A1 | 6/2018 | Faulkner | |
| 2018/0209156 A1 | 7/2018 | Petterson | |
| 2018/0321799 A1 | 11/2018 | Schwartz | |
| 2018/0332102 A1 | 11/2018 | Sheidaei | |
| 2019/0026843 A1 | 1/2019 | Kim | |
| 2019/0031253 A1 | 1/2019 | Shike et al. | |
| 2019/0138667 A1* | 5/2019 | Benesh | G06Q 50/08 |
| 2020/0027043 A1 | 1/2020 | Agassi et al. | |
| 2020/0151937 A1 | 5/2020 | Miller | |

* cited by examiner

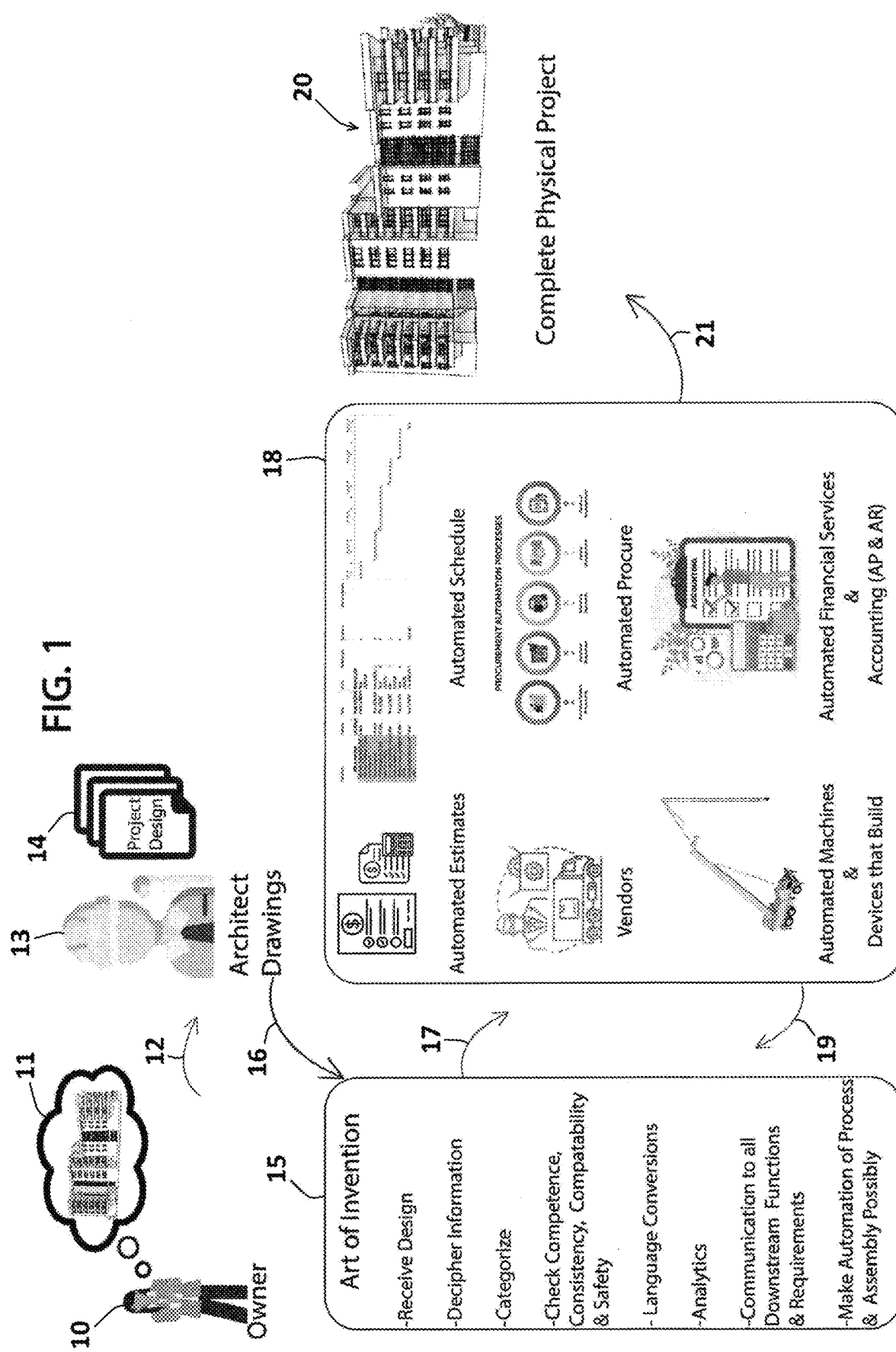

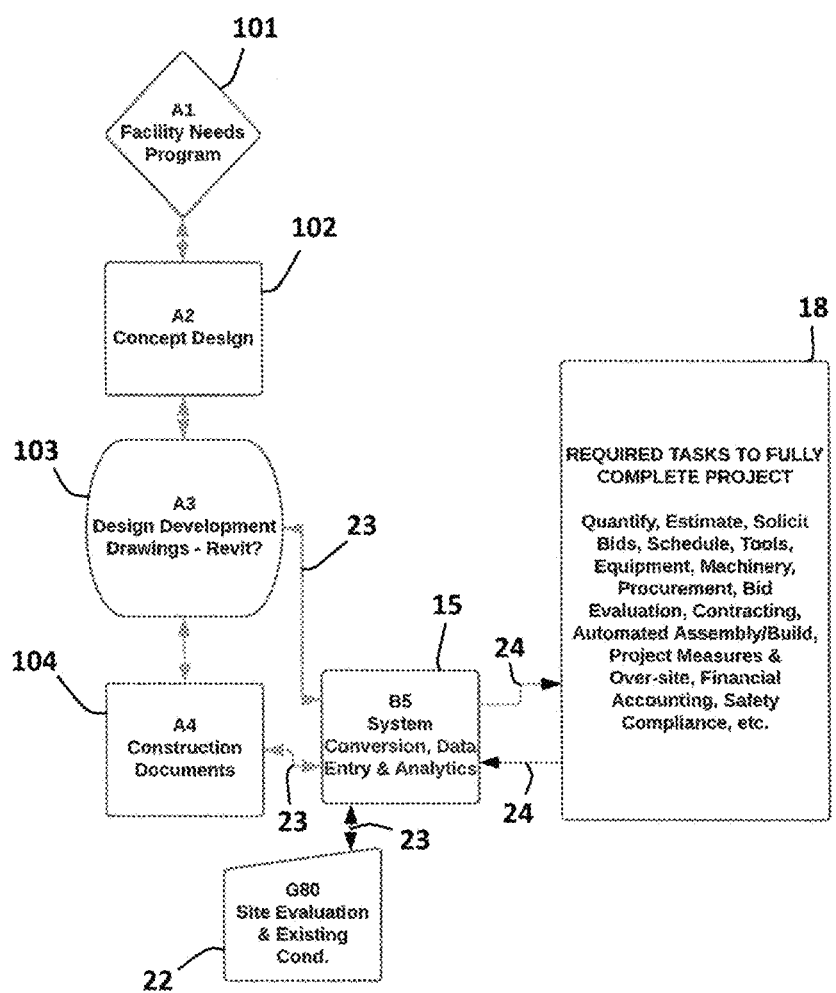
FIG 2 - MODULE B - DESIGN INPUT CONVERSION, DATA INPUT & ANALYTICS

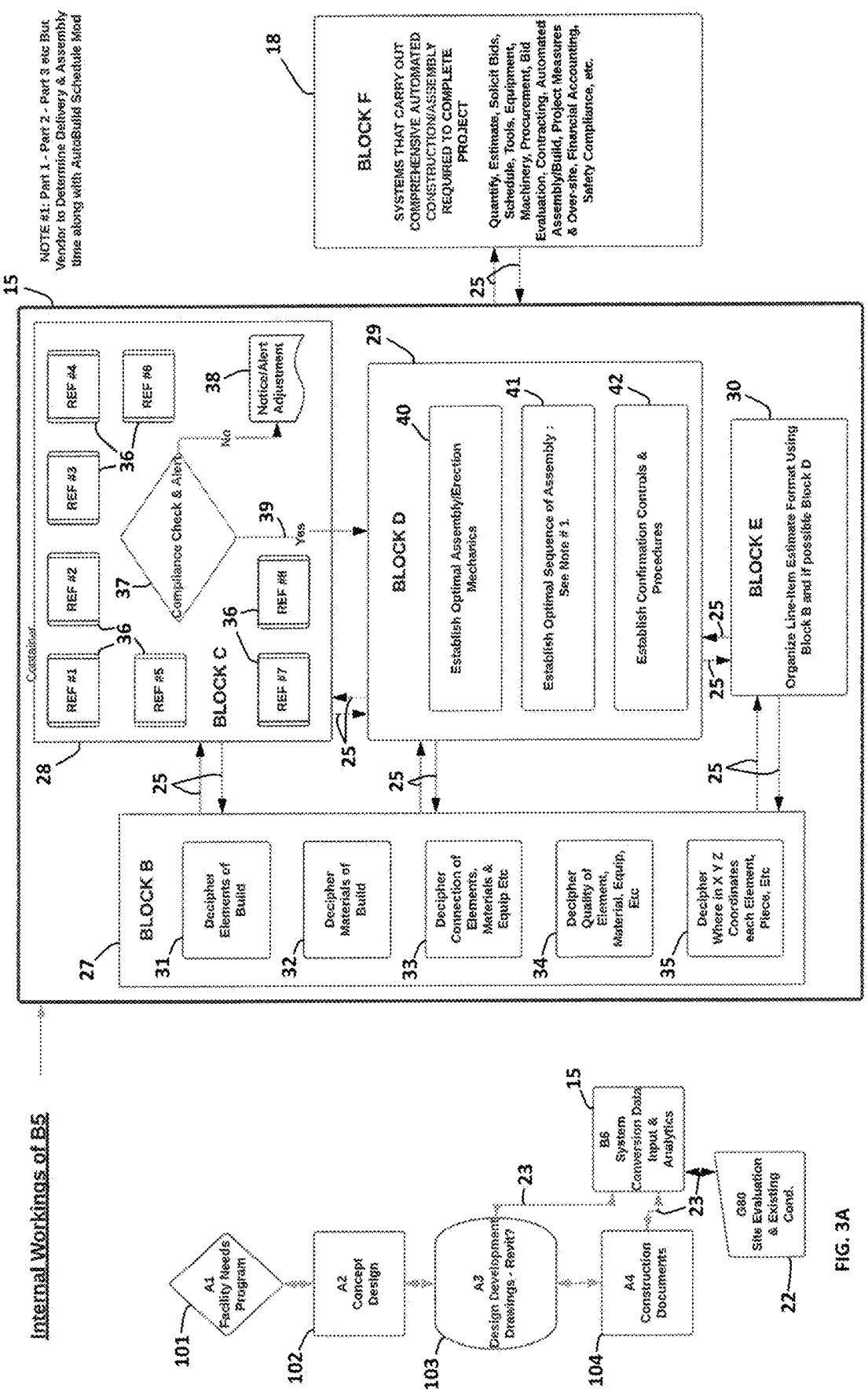

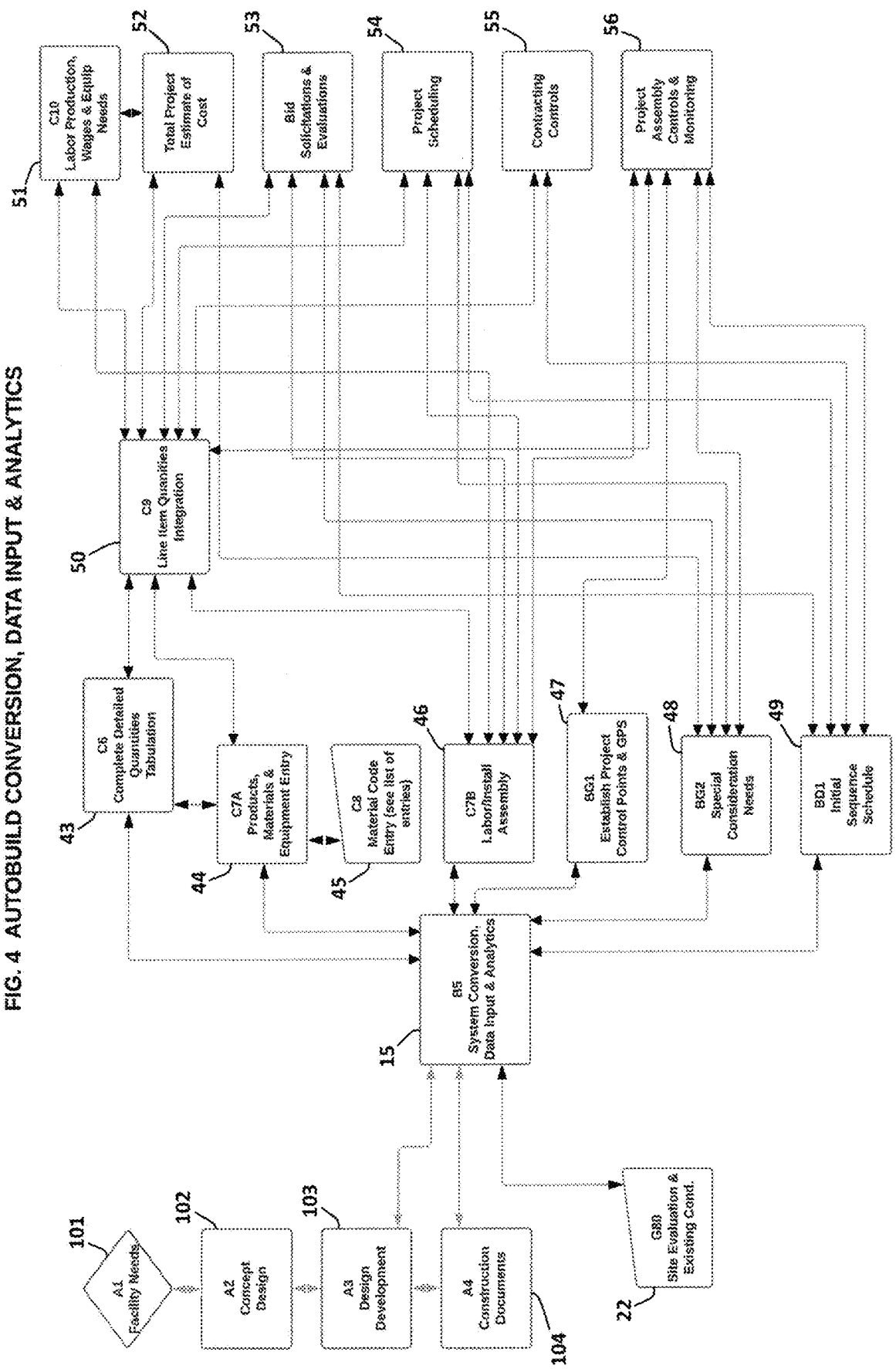
FIG. 4 AUTOBUILD CONVERSION, DATA INPUT & ANALYTICS

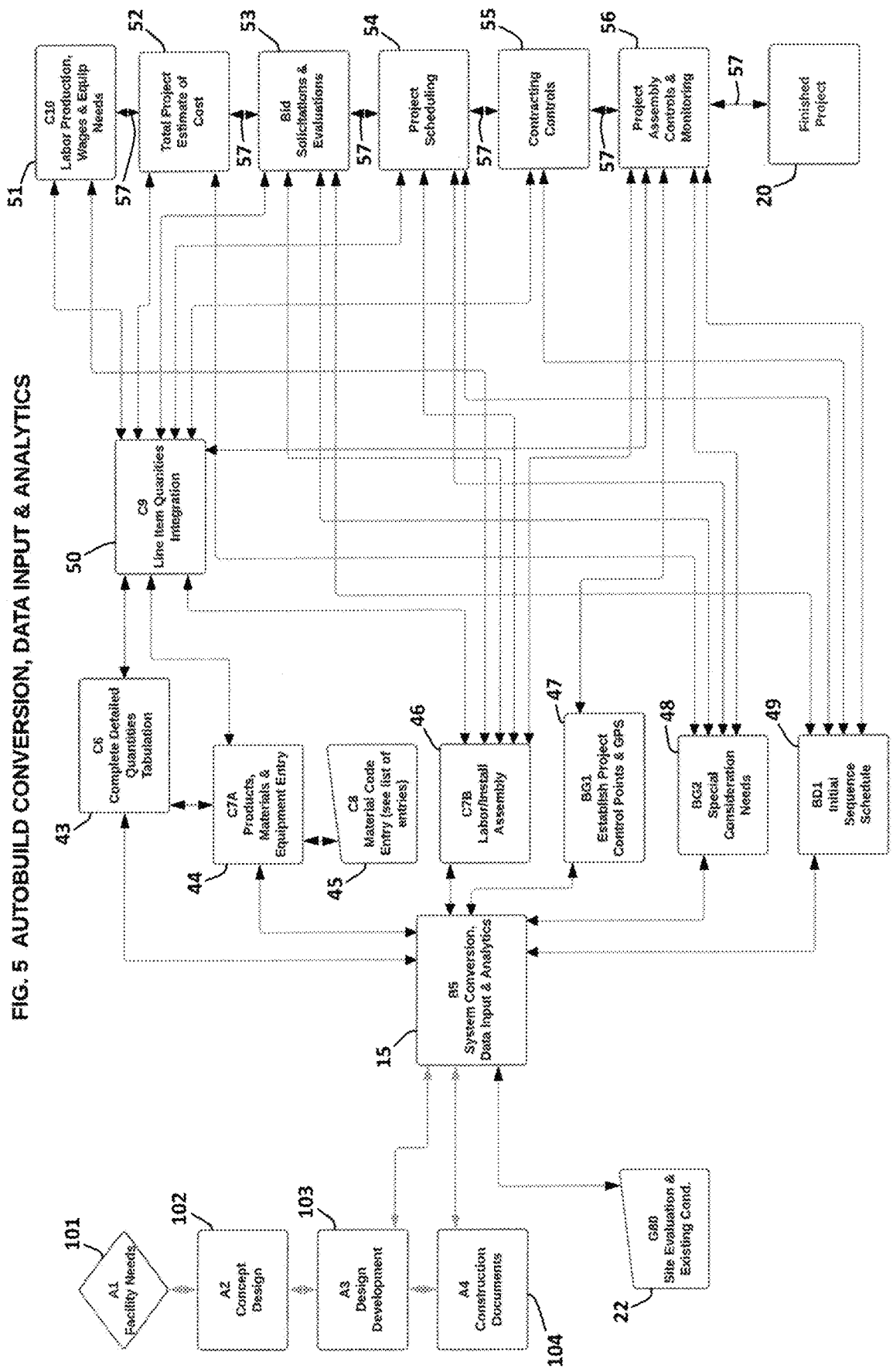
FIG. 5 AUTOBUILD CONVERSION, DATA INPUT & ANALYTICS

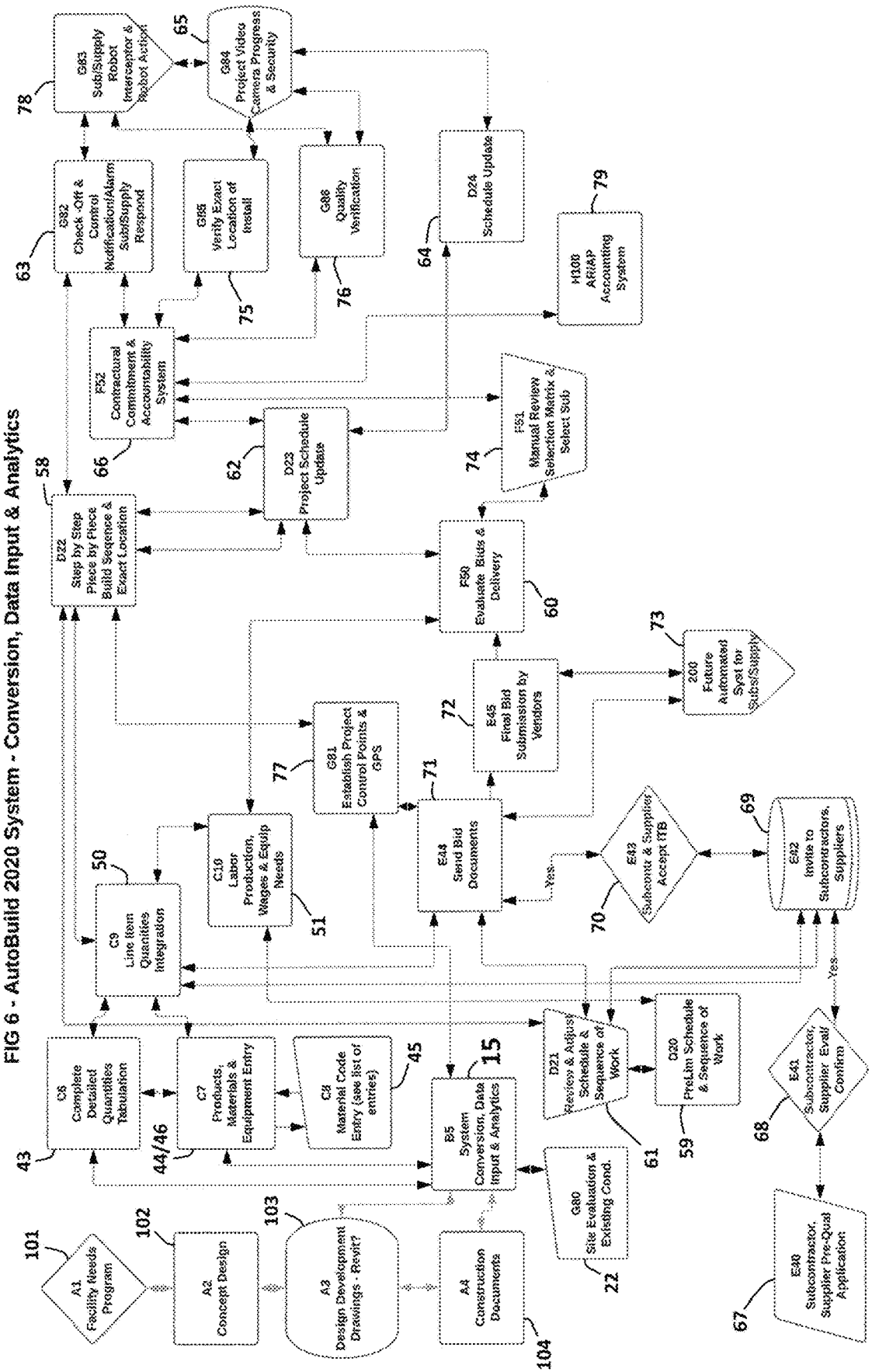
FIG 6 - AutoBuild 2020 System - Conversion, Data Input & Analytics

DATA CONVERSION, DATA ENTRY AND ANALYTICS SYSTEM AND METHOD FOR A CONSTRUCTION PROJECT TO BE BUILT IN AUTOMATION

PRIOR HISTORY

This application is a Continuation-in-Part patent application claiming the benefit of the following pending US Patent Applications, the specifications and drawings of which are hereby incorporated by reference thereto:

U.S. patent application Ser. No. 17/492,246 filed in the United States Patent and Trademark Office (USPTO) on 1 Oct. 2021;
U.S. patent application Ser. No. 17/508,277 filed in the USPTO on 22 Oct. 2021;
U.S. patent application Ser. No. 17/517,191 filed in the USPTO on 2 Nov. 2021;
U.S. patent application Ser. No. 17/533,992 filed in the USPTO on 23 Nov. 2021;
U.S. patent application Ser. No. 17/534,023 filed in the USPTO on 23 Nov. 2021; and
U.S. patent application Ser. No. 17/590,487 filed in the USPTO on 1 Feb. 2022.

FIELD OF THE INVENTION

These specifications generally relate to a system for managing the building of a construction project, and more particularly to a system for converting project design data into a unified system and language for enabling further design input management and analytics and to ultimately allow for automated construction processes, which is the main objective of this art.

BRIEF DESCRIPTION OF THE PRIOR ART

US Patent Application Publication No. 2006/00154475 authored by Birkner ('475 Publication) discloses an Integrated Construction Project Management System with Handheld Computer and Checklist. The '475 Publication describes a construction management system including a central handheld computer adapted to collect construction data including an Inspection Checklist from the field; a planning system to track budgetary information; a design system to perform site engineering assessment; and a construction system to track material consumption and progress for each project, the construction system adapted to receive data collected from the handheld computer.

U.S. Pat. No. 10,831,944, issued to Giattina ('944 Patent), discloses a System and Method to Facilitate the Design, Manufacturing, and Construction of Structures. The '944 Patent describes a system that provides standardized information to participants associated with a project based on the project design plan. The project architectural design plan can be compliant with one or more standards stored by the system. The project design plan can also incorporate information regarding products that are utilized in the project such as a plurality of prefabricated building modules. The requirements for a product are dictated by the standards established for the product and the project. Information about products used in the project can be embedded in links of the project architectural design plan.

US Patent Application Publication No. 2020/0151937, authored by Miller (937 Publication), discloses a Method and System for Construction Project Management Using Photo Imaging Measurements. The '937 Publication describes harnesses the use of photo imaging and measurement capture for use by do-it-yourselfers, handymen and small contractors. The method and system operate on mobile computing devices and includes an image recognition system. By performing various imaging-based measurements and then processing the resultant data, the method and system produces bills of materials. invoices, and receipts for the necessary tools and materials required by the construction project.

US Patent Application Publication No. 2020/0027043, authored by Agassi, et al. ('043 Publication), discloses a Construction Project Management System and Method Thereof. The '043 Publication describes a management system including processing circuitry and a memory, the memory containing instructions that, when executed by the processing circuitry, configure the system to: analyze a project data of a construction; based on the analysis of the project data, derive metadata associated with the construction project, wherein the metadata designates at least various stages associated with the construction project, and a completion threshold for each stage; and based on the metadata, generate an interface for allowing at least two end-user devices to collaboratively interact with the interface, wherein the interface provides interactive visual features indicative of a progress of each of the stages associated with the construction project. US Patent Application Publication No. 2019/0003153, authored by Shike, et al. ('153 Publication), discloses a Construction Management System, Construction Management Method, and Management Device. The '153 Publication describes a management system including an object detecting unit mounted on a work machine and configured to detect an object in a construction site and output information on the object; a shape detecting unit configured to output shape information indicating a three-dimensional shape of the object by using the information on the object detected by the object detecting unit; an information attaching unit configured to attach, to the shape information, time information indicating a time when the object is detected; and a management device configured to generate current state information on the construction site on the basis of the shape information to which a latest piece of the time information is attached.

US Patent Application Publication No. 2019/0026843, authored by Kim ('843 Publication), discloses a Method for Integrated Management Including Building Construction and Maintenance Based on Video. The '843 Publication describes a video-based integrated building construction and maintenance management method in which a series of processes of building construction and maintenance after build completion is produced as a video and registered in a building management server. The video is configured to be checked by a building owner or resident so that a building can be transparently managed by fundamentally preventing faulty construction that may occur during a construction step and untrustworthy maintenance.

US Patent Application Publication No. 2018/0332102, authored by Sheidaei ('102 Publication), discloses a Cloud-Based System for Collaborating Engineering, Operations, Maintenance, Project Management, Procurement, and Vendor Data and Activities. The '102 Publication describes certain systems and methods operable via a cloud platform utilizing Artificial Intelligence (AI). The system is configured to connect with a computerized application to store and manage data and activities of one or more departments.

The system enables vendors to access the data of one more departments to perform vendor activities such as generating quote documents. The system is further configured to provide a bid evaluation including a list of one or more vendor comprising products matching the requirements of the one or more departments. The system further enables personnel of one or more departments to select at least one vendor for placing orders and enables the selected vendor to submit data required by the personnel of one or more departments to collaborate data or for procurement.

US Patent Application Publication No. 2018/0321799, authored by Schwartz ('799 Publication), discloses a System for On-Site Tracking, Managing, Planning and Staging Construction Projects. The '799 Publication describes a construction management system for allowing a user to capture an item identifier from an item (e.g., shipment, group of components, and/or one or more components) using a mobile device. The item identifier may be used to identify a project and access a model for the product, identify a component in a model, and/or identify the components in a shipment for staging purposes.

Moreover, the system may be used to identify a status for the one or more components. The status may be that the one or more components are shipped, received, staged for assembly, installed, or the like. The status of the one or more components may be automatically updated by capturing the item identifier. Moreover, the user may also select shipment information for past, current, and/or future shipments in order to identify the one or more components associated with each of the shipments.

US Patent Application Publication No. 2018/0209156, authored by Pettersson ('156 Publication), discloses a Construction Management System and Method. The '156 Publication describes a construction management system for constructing a building including at least one heavy lifting machine for moving a one building element to a mounting position on the building, a central computing unit providing a building information model comprising at least a construction plan comprising a target state of the building construction, a three-dimensional model of an actual construction state of the building, and a three-dimensional model of the element, wherein the central computing unit is adapted to determine the mounting position for the element based on the construction plan, the model of the current construction state and on the model of the element.

US Patent Application Publication No. 2018/0174250, authored by Faulkner ('250 Publication), discloses certain Construction Project Management Systems and Methods. The '250 Publication describes an operation including the steps of generating a project profile for a construction project, determining project details of the project, determining a regulatory process to be performed during the project based on the project details and regulatory rules, determining worker's certificates or licenses corresponding to the regulatory process and the project details, determining candidate workers for the construction project from registered workers, and causing a first GUI for selection of one or more candidate workers to be generated. The first GUI includes indicators of statuses of the worker's certificates or licenses corresponding to the regulatory process with respect to each of the one or more candidate workers.

US Patent Application Publication No. 2017/0278037, authored by Pettersson ('037 Publication), describes a Construction Management System and Method for Linking Data to a Building Information Model. The '037 Publication describes a construction management system comprising a plurality of sensor means adapted to detect events at a building site of the structure, a central computing unit providing a three-dimensional model of the building site, and at least one displaying device that is adapted to display the three-dimensional model to a user. The sensor means are adapted to generate data comprising information about a detected event.

The system further comprises communication units adapted to transmit a message comprising the data and a location information to the central computing unit, assign coordinates in the three-dimensional model according to the location information, evaluate options for reacting on the event by analyzing the data, assign evaluated options to the data, and display a note which is related to evaluated options to the user in real-time at the assigned coordinates in the three-dimensional model.

U.S. Pat. No. 10,593,104 ('104 Patent), issued to Robert, et al., discloses certain Systems and Methods for Generating Time Discreet 3D Scenes. The '104 Patent describes certain methods, systems, and apparatus including medium-encoded computer program products for generating and visualizing 3D scenes of a build-site. The invention may be said to include, in one aspect, a method including: obtaining site data acquired by one or more capture devices, wherein the site data comprises data sets corresponding to two or more locations about a physical site, and each respective data set comprises (i) imaging data of the physical site, (ii) coordinate data for the imaging data, and (iii) time metadata for the imaging data. The methodology further reconstructs and outputs a series of three dimensional (3D) modeled scenes of the physical site from the site data using the imaging data, the coordinate data, and the time metadata.

Generally considering the state of the art exemplified by the patent publications briefly described above, the reader will bear in mind certain shortcomings in the construction industry at least insofar as its relatively low-level digitalization is concerned. In other words, the reader will note from a consideration of the foregoing that the state of construction industry art perceives a need for a digitalized comprehensive construction project management system that receives design component data from an outside design provider, converts the design component date into a format for use by a plurality of interconnected system-supportive, software-based modules to advance the initial design component data from design concept to final build all within a system of full or near-full automation. What follows is a summary of a first non-transitory, computer-implementable software-based application or module according to the presently disclosed subject matter.

SYSTEM BACKGROUND AND SUMMARY

In the world's pursuit to automate construction there is a need to develop a common language/communicator and automated analytics for all the many aspects of the entire process starting with a concept and need to design and build a facility. The many parts to the process include but are not limited to: facility needs, concept design, design development, construction documents, permitting, pricing, bid solicitations, scheduling, bid and pricing evaluations, contracting, procurement, deliveries, quality control, process coordination, progress verification, financial accounting, final completion checklists, etc. The construction industry perceives a need for significant improvement in terms of progression towards automation, and in this regard, there exists a need for a common communicator and organizer that understands all of the parts to the process and allows/enables communication and organization amongst the various parts in a way that is understood by all as if working within one.

The construction industry further perceives a need for built-in automated analytics to accomplish complete automation of a construction project build. In this regard, there is perceived need in the art for a system that firstly confirms a project design is competent, accurate and safe to build. The AutoBuild System Conversion, Data Entry and Analytics system according to the presently disclosed subject matter vets the project design by considering how accurate a design has to be and how accurate the communication needs to be in order for robots, drones, unmanned (non-human) machines, etc. to build a facility in automation in order for it to be correct, competent, accurate, safe, sustainable, etc. This is accomplished by the presently disclosed subject matter by utilizing and containing all current engineering standards, design standards, material properties, etc. being built into the system and continuing to evolve through an Artificial Intelligence (AI) process the components of which are configured to work together internally to provide an internal intellectual process to direct and manage automated (non-human) construction and assembly.

The AutoBuild System Conversion, Data Entry and Analytics component according to these specifications is a sub-system to an overall construction automation process or software-based system that, in some embodiments, performs data conversion of the initial design data of a construction project that derives from outside sources and creates a communication system for enabling multiple other activities and systems required to automate the process of construction from concept all the way through the physical assembly of parts and pieces to provide the final intended constructed product.

The data conversions, data vetting, and communications created by the AutoBuild System Conversion, Data Entry and Analytics software component and its peripheral components are key building blocks comprising software applications, programs, or routines that support the larger project management system as otherwise described in the applications from which these specifications claim a benefit. The overall system accommodates design review, schedule development, pricing, bid solicitations, contracting and procurement, financial accounting, and all aspects of the management of the physical assembly of the project. The Data Conversion, Data Entry and Analytics software component further provides initial, intermediate and final data traffic management and data formatting for tracking, calculating, managing, and communicating multiple aspects of the construction process for enabling successor or peripheral software components to successfully carry out their functions.

The presently disclosed subject matter essentially provides a system that can take an electronic project design and decipher the information as to detail what information is directed to elements, what information is directed to specific materials, what information is involved with connecting the materials, what information provides the quality of the elements, and what information determines where in an XYZ coordinate system each element is to be positioned. In short, all things that are required to complete the full comprehensive process are deciphered.

According to another aspect of the presently disclosed subject matter, a system is provided that receives electronic project design data and determines its competency. In other words, the presently disclosed subject matter first determines whether a design is comprehensive and competent. The system queries whether the elements are connected properly; whether the project design is safe to build; whether the elements involved with the project are compatible with the environment of the project; and whether there any errors or inconsistencies in the design. In other words, the system receives an electronic design of a project, and fully vets the project design thereby ensuring its competency down to its finest details. If the project design appears to be out of compliance or contains errors or inconsistencies, the system provides a mechanism for sending alerts and allowing for adjustments if required. The system may also make suggestions on those areas of concern or requiring correction, which suggestions may then be separately made available for outside approval.

It is to be further noted the system has its own built-in intellect made more robust by communicating with outside systems. In this regard, it is configured to have a self-evolving intellect as described in the definitions beginning at the detailed description of the preferred embodiment section, re-presented hereinafter for the reader's preliminary consideration:

"Initial Intellect Input": intellect that has been built into the system from this author, this author's resources, standard business practices, standard building practices, standard engineering and design standards, and deep comprehensive long-term experience in the industry "Self-Evolving Intellect" "Initial Intellect Input" along with AI and other industry advancements moving forward.

The system according to the presently disclosed subject matter is operable to establish an optimal assembly/erection procedure and its mechanics. In other words, the system is operable to establish the optimal sequence of assembly and is configured to establish within itself confirmation controls and procedures. The system receives electronic design information and converts it into a fully comprehensive and complete detailed line-item estimate format for the full comprehensive physical project design to build.

The system is comprehensive, and has its own self-evolving intellect to produce information that can be communicated to all other types of procedures and tasks that need to be accomplished to complete a fully competent project and all required parts down to the final delivery and use of the product/building/project. These processes include, but are not limited to quantifying elements, estimating, soliciting bids, scheduling, bid, evaluations, contracting, procurement, physical, automated assembly/build of the project, what tools and equipment are required, project measures and oversight, financial accounting, safety, compliance, etc.

The system receives an electronic design and manages, through its intellect, existing and future developments in the automation of construction. In other words, the system is configured to enable self-driving excavation, delivery vehicles, self-driving equipment, robotic drywall hangers, robotic masons, robotic plumbers, drones, etc. The system is configured to manage any robot assembly aspect of the build project. The system receives design information and deciphers, organizes and formulates a communication system in such a way that can then communicate to all devices needed to complete the physical construction, such as robots, drones, autonomous vehicles and equipment, computerized, machinery, etc.

To achieve these primary objectives, the presently disclosed subject matter provides a data entry and analytics system and method for vetting digital project design data and support construction automation processes. In some embodiments, the system and associated methodology is configured to convert source data into a uniform language system based on the vetted digital project design data to be used by peripheral downstream components to communicate in a common format a direction to build the project design competently and properly. The data entry and analytics system comprises or is operable within a computer network configured to implement non-transitory, computer-implementable, software-based components allowing communication between computers within the computer network. In some embodiments, the data entry and analytics system is configured to receive digital project design data for a project design from at least one upstream source; vet the digital project design data to provide vetted digital project design data; and provide a uniform language system based on the vetted digital project design data to be used by all peripheral downstream components to communicate in a common format a direction to build the project design competently and properly.

In other words, the data entry and analytics system comprises a centralized data entry and analytics component configured to: receive the digital project design data for a project design from at least one upstream source; analyze the digital project design data to determine whether said data competently supports a complete construction of the project design in an automated manner; provide a mechanism for updating the digital project design data so as to ensure the data competently supports the project design and an automated complete construction thereof, and transmit the digital project design data to downstream components for enabling and competently supporting completion of the project design and the automated complete construction thereof.

In some embodiments, the data entry and analytics component is compartmentalized into block components, which block components are in communication with one another within the centralized data entry and analytics component. In some embodiments, the block components comprise self-evolving intellect. In some embodiments, the centralized data entry and analytics component comprises a data decipher block component configured to decipher build elements, build materials, build connections, build qualities, and build coordinates from the digital project design data to compile a deciphered data profile.

In some embodiments, the deciphered data profile is accessible to all block components within the within the centralized data entry and analytics component. In some embodiments, the centralized data entry and analytics component comprises a data compliance block component configured to: analyze the deciphered data profile to determine whether said profile competently supports the automated complete construction of the project design; and update the deciphered data profile so as to ensure said profile competently supports the project design and the automated complete construction thereof.

In some embodiments, the data compliance block comprises a plurality of reference data sets all of which further comprise self-evolving intellect to fully vet project information related to the project design on an ongoing basis. In some embodiments, the centralized data entry and analytics component comprises an establish functions block component configured to establish optimal assembly mechanics, establish optimal assembly sequencing, and establish confirmation controls and procedures. In some embodiments, the establish functions block component cycles data from the data compliance block component to the data decipher block.

In some embodiments, the centralized data entry and analytics component comprises a line-item estimates format block component configured to organize line-item estimates formatting. In some embodiments, the line-item estimates format block component is in communication with both the data decipher block component and the establish functions block component. While summarized systemically above, the data entry and analytics method according to the presently disclosed subject matter is substantially similar to the system.

BRIEF DESCRIPTIONS OF THE DRAWINGS

Other features and objectives of the present invention will become more evident from a consideration of the following brief descriptions of patent drawings.

FIG. 1 is a first simplified cartoon type flowchart diagram depicting the process of an owner envisioning a need they have for a facility or construction project, which is then communicated to a designer to design the project in a project design electronic file that is then processed by the AutoBuild System Conversion, Data Entry and Analytics software component according to the presently disclosed subject matter eventually being finalized in a completed physical project.

FIG. 2 is a second flowchart diagram more detailed as compared to the flowchart diagram of FIG. 1 firstly depicting a centralized Data Entry and Analytics component or node in communication with the following components or nodes: a Design Drawings Development node; a Construction Documents node; a Site Evaluation and Existing Conditions node; and a Required Tasks to Fully Complete Project node.

FIG. 3A secondly depicts the centralized Data Entry and Analytics component or node in communication with the following components or nodes: a Design Drawings Development node; a Construction Documents node; and a Site Evaluation and Existing Conditions node.

FIG. 3B is presented in side-by-side relation to FIG. 3A for comparison purposes and expands the centralized System Conversion, Data Entry and Analytics node to illustrate the inner workings of the centralized System Conversion, Data Entry and Analytics system node central to the practice of the presently disclosed subject matter in communication with a Block system that carries out comprehensive automated construction/assembly required to complete a construction project.

FIG. 4 is a flowchart diagram showing a first more detailed representation of systemic flow from the centralized System Conversion, Data Entry and Analytics node.

FIG. 5 is a flowchart diagram showing a second more detailed representation of systemic flow from the centralized System Conversion, Data Entry and Analytics node.

FIG. 6 is a flowchart diagram detailing the AutoBuild 2020 System with centralized System Conversion, Data Entry and Analytics node illustrating how the centralized System Conversion, Data Entry and Analytics node is in communication with peripheral nodes to operate with and control the entire system needing to do a full automation process of assembly from an original design.

DETAILED DESCRIPTION OF THE EMBODIMENTS

When progressing through the following descriptions, the reader should note the following definitions:

"Initial Intellect Input" may be defined as that intellect built into the system from the author, his resources, standard business practices, standard building practices, standard engineering and design standards, and deep comprehensive long-term experience in the industry.

"Self-Evolving Intellect" may be defined as "Initial Intellect Input" plus Artificial Intelligence or AI input or other industry advancements moving forward.

Referring now to the drawings with more specificity, FIG. 1 is a first simplified cartoon flowchart type diagram depicting the process of an owner 10 envisioning a need she has for a facility or construction project as at balloon 11. The need for the facility or construction project is then communicated as at arrow 12 to a designer 13 to design the project in an electronic project design file 14. The drawings and other data in support of the project design 14 are then communicated as at arrow 16 to the centralized System Conversion, Data Entry and Analytics node 15. In other words, after the project is designed, or mostly designed, it is then downloaded into the Art of Invention node otherwise referred to herein as the AutoBuild System Conversion, Data Entry and Analytics node, system, or component 15.

In some embodiments, the data entry and analytics system or component 15 is configured to firstly receive digital project design data for a project design 14 from at least one upstream source. The upstream source is generally embraced by upstream components A1, A2, A3, and A4 as at reference numbers 101, 102, 103, and 104 respectively. The data entry and analytics system or component 15 then vets the digital project design data to provide fully vetted digital project design data as discussed more fully below. The data entry and analytics system or component 15 further provides a uniform language system based on the vetted digital project design data to be used by all peripheral downstream components as embraced by the "required tasks to fully complete project" box 18 in FIG. 2 to communicate in a common format a direction to build the project design 14 competently and properly.

The AutoBuild System Conversion, Data Entry and Analytics node, system, or component 15 receives the project design 14; deciphers information from and in connection with the project design 14; categories project design data; checks for competence, consistency, compatibility and safety; runs any language conversions that may be necessary; runs an analytics process; establishes communication to all downstream functions and requirements; and enables automation of build and assembly processes. Once the project design 14 is communicated 16 to the AutoBuild System Conversion, Data Entry and Analytics node or system 15, the project design 14 is absorbed, deciphered, and evaluated. As this process is taking place, a full comprehension of the project design 14 is developed, including what may be further required by way of a uniform coding language configured to re-label all aspects of the electronic project design 14 in order for it to be communicated 17 to downstream components 18 with optional feedback communications 19 so that all of the actions and events that need to take place in order to physically build/assemble the project in automation are supported.

The downstream components as lumped at box 18 in FIG. 1, include the generation of automated estimates; automated schedules; automated procurement; vendor communications; automated machinery and devices that build; and automated financial and accounting services. AutoBuild System Conversion, Data Entry and Analytics node or system 15 is configured to communicate with machines, devices, robots, drones, computers, etc. (40) to carry out physical construction 21 of the project design 14 without human labor in some embodiments. At the end of the process the project is physically complete as at 20 without necessarily needing human labor or intervention.

Referencing FIG. 2, the reader will there consider the AutoBuild System Conversion, Data Entry and Analytics Node B5 or Module B as referenced at 15 is in downflow communication with Project Design Data nodes 101 through 104 and the Site Evaluation and Existing Conditions node G80 as at 22 for receiving data therefrom needed to understand the project design 14 the owner 10 wishes to be assembled along with its intended design and is in upflow communication with various peripheral support nodes, later described, required to Price, Schedule, Contract and Build the Project 20.

The Project Design Data nodes 101 through 104 typically include a Facility Needs Program node A1 as at 101; a Concept Design node A2 as at 102; a Design Development Drawings node A3 as at 103; and a Construction Documents node A4 as at 104. The AutoBuild System Conversion, Data Entry and Analytics Node B5 or Module B as referenced at system component 15 is in communication with the Design Development Drawings node 103; the Construction Documents node 104; the Site Evaluation and Existing Conditions node 22; and the downstream components 18 in some embodiments as depicted at bidirectional arrows 23 and feedback loop arrows 24.

FIG. 3A is re-presented in side-by-side relation with FIG. 3B to depict the centralized position of the AutoBuild System Conversion, Data Entry and Analytics system component 15 adjacent the Project Design Data nodes 101 through 104 and the Site Evaluation and Existing Conditions node 22. FIG. 3B is an expanded depiction of the AutoBuild System Conversion, Data Entry and Analytics system component 15 to depict the inner workings of the system conversion, data entry and analytics system component 15 which is central to the practice of the presently disclosed subject matter. The system component 15 receives, deciphers required information, analyzes design, completes compliance checks and organizes all elements of a project design to carry out the function of building/assembling a project 20 in automation.

Referencing FIG. 3B, the reader will there consider the system component 15 comprises an array of blocked portions or block components, including a Block B portion 27; a Block C portion 28; a Block D portion 29; and a Block E portion 30. The AutoBuild System Conversion, Data Entry and Analytics system component 15 is compartmentalized into a block components in some embodiments, which block components are in communication with one another within the centralized data entry and analytics system component 15. In some embodiments, the block components comprise self-evolving intellect as defined herein.

The Block B portion 27 is a data decipher block component configured to decipher: build elements, build materials, build connections, build qualities, and build coordinates from the digital project design data, which when combined or together compiled provide a deciphered data profile for the project design 14. The Block C portion 28 is a data compliance block component configured to: analyze the deciphered data profile to determine whether said profile competently supports the automated complete construction of the project design; and update the deciphered data profile so as to ensure said profile competently supports the project design and the automated complete construction thereof. In some embodiments, the data compliance block 28 comprises a plurality of reference data sets as at 36 all of which further comprise self-evolving intellect to fully vet project information related to the project design 14 on an ongoing basis.

The Block D portion 29 is an establish functions block component configured to establish optimal assembly mechanics, establish optimal assembly sequencing, and establish confirmation controls and procedures. In some embodiments, the establish functions block component 29 cycles data from the data compliance block component 28 to the data decipher block component 27. In this regard, the reader will see from FIG. 3B, the establish functions block component 29 is in communication with the data compliance block component 28 and in communication with the data decipher block component 27.

The Block E portion 30 is a line-item estimates format block component configured to organize line-item estimates formatting. In some embodiments, the line-item estimates format block component 30 is in communication with both the data decipher block component 27 and the establish functions block component 29. The deciphered data profile compiled at the data decipher block component 27 primarily informs the line-item estimates format block component 30, but information from the establish functions block component 29 may be fed into the line-item estimates format block component 30 as may be required. In some embodiments, the Block B portion 27 is in communication with each of the Block C, Block D, and Block E portions 28-30 as at feedback arrows 25. Further, in some embodiments, the Block D portion 29 is in communication with the Block C portion 28 as at arrows 26 and in communication with the Block E portion 30 as at feedback arrows 25.

The Block B portion 27 is configured to decipher elements of the project design or build as at box 31; decipher materials of the project design or build as at box 32; decipher connection of elements, materials, equipment, etc. as at box 33; decipher quality of elements, materials, equipment, etc. as at box 34; and decipher where in X, Y, and Z coordinates each element, piece, etc. are to be positioned as at box 35. In some embodiments, the Block C portion 28 may be said to comprise a number of reference predefined processes as at 36 along with a compliance check and alert query process as at 37. If the compliance check and alert query process 37 returns non-compliance, a notice and/or alert adjustment is provided as at 38. If the compliance check and alert query process 37 returns compliance, data flow is directed to the Block D portion 29, which Block D portion 29 establishes optimal assembly/erection mechanics as at box 40; establishes optimal sequence of assembly as at box 41; and establishes confirmation controls and procedures as at box 42. The reader will note the processes of the Block D portion 29 are subject to vendor determinations regarding delivery and assembly time in concert with the AutoBuild Scheduling node as more fully described in U.S. patent application Ser. No. 17/533,992 from which this application claims a benefit. The Block E portion is configured to organize line-item estimate format using the Block B portion 27, and if possible, the Block D portion 28.

Referencing FIGS. 4 and 5, the reader will there consider flowchart diagrams detailing downstream processes relative to the AutoBuild System Conversion, Data Entry and Analytics system component 15. FIGS. 4 and 5 depict the AutoBuild System Conversion, Data Entry and Analytics system component 15 in downflow communication from the series of data input streams from the Project Design Data nodes 101 through 104 with an array of branching software modules or nodes in communication from the System Conversion, Data Entry and Analytics node or system component 15. In direct communication with the System Conversion, Data Entry and Analytics node or system component 15 are the following nodes: Complete Detailed Quantities Tabulation node C6 as at box 43; Products, Materials, and Equipment Entry node C7A as at box 44; Material Code Entry node C8 as at box 45; Labor/Install Assembly node C7B as at box 46; Establish Project Control Points and Global Positioning System (GPS) node BG1 as at box 47; and Special Consideration Needs node BG2 as at box 48; and Initial Sequence Schedule node as at box 48.

The reader will note the Products, Materials, and Equipment Entry node C7A as at box 44 is in communication with both the Complete Detailed Quantities Tabulation node C6 as at box 43 and the Material Code Entry node C8 as at box 45. The Complete Detailed Quantities Tabulation node C6 as at box 43, the Products, Materials, and Equipment Entry node C7A as at box 44, and the Labor/Install Assembly node C7B as at box 46 are in communication with a Line Items Quantities Integration node C9 as at box 50. The Line Items Quantities Integration node C9 as at box 50 is in communication with a Labor Production, Wages and Equipment Needs node C10 as at box 51; a Total Project Estimate of Cost node as at box 52; a Bid Solicitations and Evaluations node as at box 53; a Project Scheduling node as at box 54; a Contracting Controls node as at box 55; and a Project Assembly Controls and Monitoring node as at box 56.

Noting that the Labor/Install Assembly node C7B is in communication with the Line Items Quantities Integration node C9 as at box 50, the Labor/Install Assembly node C7B is in further communication with the following nodes: the Labor Production, Wages and Equipment Needs node C10 as at box 51; the Bid Solicitations and Evaluations node as at box 53; the Project Scheduling node as at box 54; and the Project Assembly Controls and Monitoring node as at box 56. The Establish Project Control Points and GPS node BG1 is in communication with the Project Assembly Controls and Monitoring node as at box 56. The Special Consideration Needs node BG2 is in communication with the following nodes: the Total Project Estimate of Cost node as at box 52; the Bid Solicitations and Evaluations node as at box 53; the Project Scheduling node as at box 54; and the Project Assembly Controls and Monitoring node as at box 56.

The Initial Sequence Schedule node BD1 is in communication with the Bid Solicitations and Evaluations node as at box 53; the Project Scheduling node as at box 54; the Contracting Controls node as at box 55; and the Project Assembly Controls and Monitoring node as at box 56. The Labor Production, Wages and Equipment Needs node C10 as at box 51 is in communication with the Total Project Estimate of Cost node as at box 52. Comparing FIG. 4 versus FIG. 5, the reader will there see the flowchart diagrams are substantially similar in directional flow communications between the various nodes. FIG. 5 further depicts communication between the AutoBuild System Conversion, Data Entry and Analytics system component 15 and the (1) Design Development node A3 as at box 103; (2) the Construction Documents node A4 as at box 104 and the Site Evaluation and Existing Conditions node 22. FIG. 5 further depicts the Finished Product as at box 20.

Referencing FIG. 6, the reader will there consider how the System Conversion, Data Entry and Analytics system component 15 operates with and controls the entire system as a central hub node B5 enabling a full automation process of assembly from an original design. FIG. 6 is a re-presentation of the subject matter otherwise presented in FIG. 1 of U.S. Pat. No. 11,321,791 issued on 3 May 2022 ('791 Patent) from which these specifications descend. In other words, these specifications build upon the subject matter otherwise detailed in the '791 Patent with an updated focus upon the System Conversion, Data Entry and Analytics system component 15 with refined details thereof described in more detail below.

In describing the subject matter made the subject of these specifications, it will be noted the System Conversion, Data Entry and Analytics system component 15 is a subpart or subsystem to an overall software-based construction automation process and here referred to as a node, or in this case Node B5. A software program may comprise numerous modules or nodes as separate executable files that form parts of a whole program. A module is a software component or part of a program that contains one or m ore routines. One or more independently developed modules or nodes make up a program. An enterprise-level software application may contain several different modules or nodes, and each module or node serves unique and separate business operations. Given the complexity of the overall operating system, the author has selected the term module or node to describe the software modules or nodes that together cooperate to provide or support a Comprehensive Construction Project Management System related to the subject matter of the '791 Patent.

Module B5 is a software-based interface system between incoming Project Design Data (as provided by state-of-the-art Module A nodes) and a Project Data Survey, Code Match and Organize Module C, that then continues on to facilitate other downstream software used to build a project in automation, as otherwise introduced in the '791 Patent. Referencing FIG. 1, in simplistic diagram form, for example, it will there be seen the System Conversion, Data Entry and Analytics Node B5 or Module B5 as at 15 is in downflow communication with Project Design as at 14 for receiving data therefrom and is in upflow communication with various peripheral nodes 18 of the overall system that each have an essential function required to provide a complete and comprehensive physical assembly/build of a construction project.

Referencing FIG. 2, it will be seen the System Conversion, Data Entry and Analytics Node B5 as at 15 is in downflow communication with Project Design Data nodes 101-104 and the Site Evaluation and Existing Conditions node 22 for receiving data therefrom required to understand the construction project to be assembled along with its intended design and is in upflow communication with various nodes, later described, required to Price, Schedule, Contract and build the construction project.

Comparatively referencing FIGS. 3A and 3B, the reader will there consider the networked intercommunications of the System Conversion, Data Entry and Analytics Node 15 as it carries out its functions into Block F as at 18 embracing all downstream components from the System Conversion, Data Entry and Analytics Node 15. The System Conversion, Data Entry and Analytics Node 15 is the centralized systemic component that is configured to decipher, categorize, quantify, analyze, communicate which processes are all required to lead all automation from that point on in order to comprehensively price, schedule, contract, measure, and assemble the construction project as intended through an automation process.

The System Conversion, Data Entry and Analytics Node B5 as at 15 is in downflow communication with the Project Design Data nodes and the Site Evaluation and Existing Conditions node 22 for receiving data therefrom and is in upflow communication with various nodes with Block F 18 that are later called upon to complete the entire comprehensive construction process that provides the final intended finished project 20 including all peripheral aspects such as pricing, contracting, procurement, financial accounting, scheduling, quality control, etc.

Once the project design 14 is downloaded to and received by the System Conversion, Data Entry and Analytics Node 15, the System Conversion, Data Entry and Analytics Node 15, based on intellect that has been built into the system from the author, the author's resources, standard business practices, standard building practices, standard engineering and design standards, and deep comprehensive long-term experience in the industry called "Initial Intellect Input", will decipher the information given and organize/group information deciphered into bins later to be used as resource information that is utilized downstream.

In this case bins are developed that include but are not limited to: deciphered elements of the build as at box 31, deciphered materials of the build as at box 32, deciphered connection of elements, materials and equipment etc. as at box 33, deciphered quality of element, material, equipment etc. as at box 34, and deciphered where each element, piece, part, etc. is required to be placed in a X-Y-Z coordinate system as at box 35. Once the information has been deciphered and put into these bins, the System Conversion, Data Entry and Analytics Node 15 with its "Initial Intellect Input" along with AI and other industry advancements moving forward, defined as "Self-Evolving Intellect", a compliance check with an alert system as at query box 37 takes place.

Within Block C 28 alongside the compliance check and alert process 37, the reader will there consider several exemplary reference data sets as at boxes 36. These reference data sets 36 all contain "Self-Evolving Intellect", in several categories and disciplines and include all such reference data points that are required to fully vet the project information and project design information in order to carry out the comprehensive stages and ancillary processes required to deliver the finished project 20 as intended. Examples of these reference data points 36 include but are not limited to: intellect from the author, the author's resources, standard business practices, standard building practices, standard engineering and design standards, deep comprehensive long-term experience in the industry, etc.

The reference data points 36 further include all depths of disciplines required such as civil engineering, structural engineering, mechanical engineering, electrical engineering, material property analytics, physics and environmental analytics, spatial and navigational analytics, moisture and atmospheric analytics, etc. These reference data points 36 along with their analytics are configured confirm the construction project will be carried out competently and accurately from the precise color of materials to the strength of those materials; from accurate connections of materials to materials; to what is needed to measure for quality control; from quantity of elements to compatibility of elements and equipment as they integrate within the project; and from environmental and moisture concerns to longevity of elements. This is a short exemplary listing of how comprehensive system vets the construction project.

Once the compliance check and alert system 37 completes its processing, a notice/alert/adjustment 38 is communicated if the non-compliance is detected. This communication is delivered from a standpoint that either the software system itself can receive and understand the information and/or a human being can receive and understand the information. This notice/alert adjustment notice 38 confirms a kind of apprehensive compliance and also note what is of concern and what is not in compliance. The notice/alert adjustment notice 38 also communicates recommendations/adjustments to correct the concern. This process continues until all concerns are addressed.

Once all concerns have been addressed, or are in the process of being addressed, the System Conversion, Data Entry and Analytics Node 15 continues or advances processing into Block D 29. Within Block D 29 the intellect is extended using "Self-Evolving Intellect" where it establishes things such as, but not limited to: optimal assembly/erection mechanics as at box 40; optimal sequence of assembly as at box 41; confirmation of controls and procedures as at box 42. Once processing at Block D 29 is completed, data is then communicated to Block E to accommodate further tasks also with its "Self-Evolving Intellect" such as organizing the line-item estimate formats as at box 30

Once the operations described above are completed, the System Conversion, Data Entry and Analytics Node 15 is then prepared to communicate and transmit its information downstream to several functions that are as example (simplified) described in within Block F as at 18. These processes may include, but not be limited to soliciting bids, scheduling, estimating, bid evaluation, contracting, procurement, physical automated assembly/build with tools and equipment, project measures and oversight, financial accounting, safety compliance, etc. A more detailed diagram showing these operations are shown in FIG. 4 which is discussed in more detail below.

Summarizing what is discussed above, the System Conversion, Data Entry and Analytics Node 15 receives all design information inputted to it and takes the information, deciphers it, vets it from a compliance check, notifies corrections required, and prepares to have all information ready to be transferred in a proper way for further elements and operations to take place from downstream software/computer hardware/etc. (nonhumans) to carry out procedures and tasks required to provide a comprehensive completed project that is intended such as solicit bids, scheduling, estimating, bid evaluation, contracting, procurement, physical automated assembly/build with tools and equipment, project measures and oversight, financial accounting, safety compliance, etc.

Comparatively referencing FIGS. 4 and 5, the reader will there consider the illustrated need and comprehensiveness of the System Conversion, Data Entry and Analytics Node 15. FIG. 4 depicts how the information received by the System Conversion, Data Entry and Analytics Node 15 is organized, managed and distributed to all other aspects of a complete construction process. Although the presently disclosed subject matter does describe in detail the following listing of technologies, the listing is here included to bring to the reader's attention all the aspects of the downstream components and processes of construction that are considered by System Conversion, Data Entry and Analytics Node 15 for further export with full comprehension to downstream components so that a complete automated construction process can take place. Referencing FIG. 4, the reader will note certain exemplary downstream components are, but not limited to:

1. C10—Labor Production, Wages and Equipment Needs as at box 51;
2. Total Project Estimate of Cost as at box 52;
3. Bid Solicitation and Evaluations as at box 53;
4. Project Scheduling as at box 54;
5. Contracting Controls, including Project Accounting as at box 55; and
6. Project Assembly Controls and Monitoring as at box 56.

The foregoing is an exemplary listing of certain primary downstream components and, for ease of illustration, does not necessarily list some of the finer details of the construction process that the System Conversion, Data Entry and Analytics Node 15 will apply and export to. Comparatively referencing FIGS. 4 and 5, the reader will see that FIG. 5 sets forth substantially the same illustrative matter as in FIG. 4, but further illustrates how the above list of downstream components 52, 53, 54, 55, and 56 cross-communicate or communicate as at arrows 57 to support the finished product as at 20. The System Conversion, Data Entry and Analytics Node 15 provides the infrastructure support for accommodating the cross communication 57 of the downstream components 52, 53, 54, 55, and 56 as exemplified. For the most part this is achieved by the common categorization, organization, communication and management that is being utilized within the 53, 54, 55, and 56 as supported by the Project Data Survey, Code Match and Organize modules denoted by modules bearing C nomenclature so that all systems cooperate and function to seamlessly advance the project toward the finished product 20.

As an example, the C9 Node as at box 50 communicates with (a) the C10—Labor Production, Wages and Equipment Needs Node as at box 51; (b) the Total Project Estimate of Cost Node as at box 52; (c) the Project Scheduling Node as at box 54; and (d) the Contracting Controls Node as at box 55. All this information and data is needed and can be utilized in the "Bid Solicitation and Evaluations" process Node as at box 53 with which the C9 Node 50 further communicates. This network of communication governed by the B and C Modules comprehensively provides the information required for vendors to properly bid the project and for the evaluation of those bids to be correctly analyzed using all the exact same information. The System Conversion, Data Entry and Analytics B5 Node 15 oversees, governs, or manages the common categorization, organization, and communication infrastructure required so that all systems are per se working on the same page.

Another example may be understood by referencing the Initial Sequence Schedule BD1 Node as at box 49 in communication with (a) the Bid Solicitation and Evaluations Node 53; (b) the Project Scheduling Node 54; (c) the Contracting Controls Node 55; and (d) the Project Assembly Controls and Monitoring Node 56. All the information and data provided by these nodes is required and can be utilized by each of the same four components of the building process: Bid Solicitation and Evaluations, Project Scheduling, Contracting Controls, and Project Assembly Controls and Monitoring and all being done with the common categorization, organization, communication, and management that is being utilized within the System Conversion, Data Entry and Analytics Node 15 so that all systems are per se working on the same page. The foregoing examples are but two examples of the numerous benefits that the System Conversion, Data Entry and Analytics system 15 can provide to the entire construction process to make it most comprehensive, expeditious, cost-effective and error free.

Referencing FIG. 6, the reader will there consider a relatively more fully developed flowchart of the networked nodes that support the overall system. In this regard, each node is denoted with a prefix letter that matches the Module to which the node is most closely associated. For example, the B5 Node is substantially the same as or embraced by the System Conversion, Data Entry and Analytics system 15 otherwise comparatively depicted in FIGS. 1-5. Module C basically comprises Nodes C6, C7, C8, C9, and C10; Module D basically comprises Nodes D20, D21, D22, D23, and D24; Module E basically comprises Nodes E40, E41, E42, E43, E44, and E45; Module F basically comprises Nodes F50, F51, and F52; Module G basically comprises Nodes G80, G81, G82, G83, G84, and G85; and Module H is substantially equivalent to Node H100, all of which are discussed in more detail by the following descriptions.

Recalling the A1, A2, A3, and A4 Nodes as at 101, 102, 103, and 104, respectively, the following is a narrative of the function of the A1-A4 Nodes as referenced at 101, 102, 103, 104 upon which the overall AutoBuild system according to the present invention builds, and thus technically fall outside the scope of the present invention although it should be noted the present invention necessarily receives input from the A nodes so as to properly manage the remainder of the project. Grayscale arrowheads lead from the A series nodes into the B node or AutoBuild Conversion, Data Entry, and Analytics component 15. Black arrowheads are reflected intermediate all downstream components from the A series components to help the reader understand the A series nodes generally fall outside the scope of the presently disclosed subject matter.

The A1 Node referenced at 101 is a Facility Needs and Programming Node. This is the first stage of a project where an outside owner/customer as denoted at 10 decides the owner requires a facility or expansion project as at 11 and communicates as at 12 the requirement to an Architect or Engineer or A/E as at 13. The Architect or Engineer (A/E or Design) industry professional 13 creates a framework called Facility Needs and Programing as at 101. This framework sets the criteria with which to start designing the facility including such facility aspects as size, level of floors, functions, special equipment accommodation, special climate control, level of finishes, access needs, etc.

The A2 Node referenced at 102 is a Conceptual Design Node. This is a node state in which the A/E (Design) industry professional 13 completes an initial design of the facility for the owner/customer 10 to review. This node provides the first few steps the design professional 13 takes to make sure the design professional's vision for the project is in agreement with the vision 11 the owner/customer 10 has for the facility so as to avoid spending substantial amounts of time and cost developing a project design that is otherwise developing in a disagreeable direction as dictated by the owner/customer 10.

The A3 Node referenced at 103 is a Design Development Drawings Node. This is a development phase in which the A/E (Design) industry professional 13 completes the design in further detail and begins providing specifications on form and function along with material support for the project. This is an intermediate step in which the design is considered approximately 70-80% complete. It sets a milestone for another review with the owner/customer 10 to confirm the design meets the needs of the owner/customer 10. This stage also allows contractors to start reviewing the facility and design to provide initial pricing for the owner/customer 10 to ensure the project is being designed within the allocated budget.

The A4 Node as referenced at 104 is a Construction Documents Node. This development phase or state occurs when the A/E (Design) industry professional 10 completes the design with final details or specifications. It includes the finer specifics of each element of the project, and specifies each material to be used to the specifics of color, manufacture, special requirements, etc. The overall AUTOUTOBUILD system/platform according to the present invention as generally depicted in FIG. 6 is designed to receive the Construction Documents and analyze the Construction Documents for errors or inconsistencies at the B5 Node or the System Conversion, Data Entry and Analytics system 15, which system is central to the practice of these specifications.

In other words, the data input is reviewed by the AUTOBUILD system/platform at the Data Conversion, Data Entry and Analytics system 15 for identifying specifics that have not been provided or designed and thus the A4 Node 104 can be optionally completed with the AUTOBUILD system according to the presently disclosed subject matter. The reader will again note that Nodes 101-104 are not included in the overall AUTOBUILD system according to the presently disclosed subject matter, but are direct, critical inputs from the A/E industry in state-of-the-art formats currently available in the market.

The owner/customer 10 or A/E (Design) industry professional 13 typically first communicates with a general contractor to make enquiries regarding pricing/estimates based on the project documents developed to date. In such cases, the general contractor directs the project estimate and schedule into the flow as developed from design data input as received from the A/E (Design) industry professional 13. In this regard, the reader will further consider certain key or primary Nodes B5, C6, C10, and D20 as generally referenced in FIG. 6 and discussed in more detail below.

Referencing Node B5, the reader will there again consider the System Conversion, Data Entry and Analytics system 15. This is the entry point or component of the overall system that receives the design development drawings as provided by Node 103 and the construction documents as provided by Node 104. In other words, the B5 Node or system 15 operates as a portal for receiving electronic design information from the general contractor or A/E (Design) industry professional 13. The B5 Node or system 15 receives and converts the electronic design information and design intent into an information file to be used to communicate to the rest of the overall AUTOBUILD system to carry out the entire completion of the project.

For example, Node B5 as at system 15 may preferably operate to receive an AUTODESK® Revit or AutoCAD design file as provided by Autodesk, Inc., a Delaware Corporation with business address of 111 McInnis Parkway, San Rafael, California, 94903. The overall AUTOBUILD system accordingly receives data via Node B5 and converts the data provided by the incoming design file, which converted data is recognized by the master operating system to carry out all the tasks needed to complete the pricing and construction of the project. The reader will further note that the B5 Node 15 further operates to receive data input from a Site Evaluation and Existing Conditions G80 Node as at 22 in upflow communication with the B5 Node 15.

The data provided by this entry point G80 Node 22 derives from existing knowledge, data and documents depicting the current site conditions along with GPS and camera monitoring systems to evaluate site conditions needed to be considered for the construction of the project. The G80 Node 22 assists in providing data concerning all types of site conditions such as existing structures on the site, existing utilities, topographic elevations of the site, water flow and sheeting across the site, locations of existing curbs, paving, and other traffic rights-of-way, etc.

The G80 Node 22 is utilized in the planning of the project, determination of scope, and coordinating project site logistics.

Node C6 as at box 43 is a Detailed Quantities Tabulation Node in communication with the B5 Node 15. The Detailed Quantities Tabulation C6 Node 43 operates to identify and quantify each specific material piece or element required for the project in detail from large equipment and structural components such as excavation cut and fills, steel members, electrical conduits, and masonry flashings to smaller items such as fasteners (e.g. screws and nails) and adhesives. If an element or piece appears to be missing from the design specifications to complete the project as determined by the compliance check and alert processing at query box 37, an RFI alert may be communicated in a Request for Information document or RFI format as at alert box 38 before the entire process can be calculated and completed. The Detailed Quantities Tabulation C6 Node 43 ensures that every piece of material required for the project has a quantity.

Node C7 (comprising nodes C7A as at box 44 and C7B as at box 46) essentially provides a Materials, and Equipment (Product) Designations Node in communication with the B5 Node 15. The Materials, and Equipment (Product) Designations C7 node ensures that every material element and piece of equipment is properly identified as to exactly what it is as required in the development of the specifications describing all products required for the project. When the system identifies an element that is required, but not yet specified, the system will prompt the user with a notice (as at alert box 38) that a product has not been specified. The C7 Node may optionally suggest a preferred product or material element. Node C8 as at box 45 as referenced in FIG. 6 is a Material Code Entry node in communication with Materials, and Equipment (Product) Designations C7 Node.

The Material Code Entry C8 Node 45 is the port of entry for selecting and specifying each material and piece of equipment (Product). The Material Code Entry C8 node 45 builds a database of all materials and pieces of equipment that are utilized in the industry for building facilities. The Material Code Entry C8 Node 45 is preferably designed to provide a selection process that can either be manually updated or automatically updated as necessary for matching and entering all products required for the project. The material code entry listing data may preferably include, but not be limited to (1) Building Product and Construction Material Division Number(s) data; (2) Type(s) of Material data; (3) Long Lead Item(s) data; (4) Weather Sensitivity data; (5) Required Predecessor data; (6) Special Requirements data; (7) Weight data; (8) Size (data); (9) Color data; and (10) Quantity data (if known).

Node C9 as at box 50 is a Line-Item Quantity Integration Node in communication with both the Detailed Quantities Tabulation C6 Node 43 and the Materials, and Equipment (Product) Designations C7 node. The Line-Item Quantity Integration C9 Node 50 creates the first stage of the cost estimate summary by combining and tabulating data as received from the C7 Node in further communication with the Material Code Entry C8 Node 45. The Line-Item Quantity Integration C9 Node 50 organizes all products needed for the project with the required quantity in a spreadsheet-like format and further communicates the organized information clearly so that associated costs can be solicited. The C9 Node 50 communicates with a Step-by-Step Place-by-Place Build Sequence and Exact Location D22 Node as at box 58 for identifying piece-by-piece building requirements and tapping into a resource database as built into the D22 node in some embodiments.

Node C10 as at box 51 is a Labor Production, Wages, and Temporary Materials and Equipment Node and is in communication with the Line-Item Quantity Integration C9 Node 50. The Labor Production, Wages, and Temporary Materials and Equipment c10 Node 51 identifies all items in the C9 Node 50 that require labor, permanent and temporary materials and equipment to assemble parts of the project design. The C10 Node 51 thus receives the product line item and quantity data from the C9 Node 50 and calculates the standard production that will be required to put the product in place.

The C10 Node 51 also considers the level of difficulty or ease with which the proposed production could be carried out and make final adjustments to that production. This node understands the wage rates in which the project is located and utilizes those wage rates in calculating the total labor cost for that line item. In this regard, it is contemplated that manual labor is becoming increasingly replaced by automated means. Accordingly, construction projects are becoming increasingly automated. The overall AUTOBUILD system according to the presently disclosed subject matter is designed to embrace these automated assembly methods by way of the C10 Node 51.

In other words, the C10 Node 51 is designed to constantly evolve as automation of labor enters the industry. Notably, many aspects of a build project require not only manual labor, but also permanent/temporary materials and equipment to support the labor/assembly function. Examples of temporary equipment may include machinery used for demolition and excavation; formwork for pouring concrete; shoring and/or scaffolding material; equipment utilized for earth retention or access to higher portions of a facility; temporary enclosures which are utilized for traffic control or maintaining heated environments within colder working conditions, etc. The temporary materials and equipment are very much associated with the labor requirements of the project and not as clear-cut as a direct, permanent line item. These temporary materials and equipment are thus identified and costed by way of the C10 Node 51.

Node C10 51 is further utilized to create an initial cost estimate of assembly labor for the project and is utilized as a resource and comparison to the subcontractor market that shall be bidding and providing firm contractual cost commitments to the project. Information from the C10 Node is also utilized to compute the basic project schedule function of the Preliminary Schedule and Sequence of Work Node D20 as referenced at box 59 in communication with the C10 Node 51. The C10 Node 51 is further utilized to confirm and evaluate the total cost bid evaluation function of an Evaluate Bids and Delivery Node F50 as referenced at box 60 in communication with the C10 Node.

The D20 Node 59 comprises standard assembly intelligence built into its system and evaluates the contract documents; line items products and quantities; generates labor productions; and produces a preliminary project schedule based on this information. The D20 Node 60 further considers site logistics, level of difficulty of project, effects of weather from the region, etc. The schedule produced is easily legible and understood by a construction professional with ordinary level of skill or construction assembly knowledge. The D20 Node 59 is available to vendors to review and comment on its accuracy which will alert the overall AUTOBUILD system operator to evaluate in Node D21 as at box 61.

The D21 Node 61 is a Manual Review and Adjustment of Schedule and Sequence Node in communication with the D20 Node 59. The Manual Review and Adjustment of Schedule and Sequence D21 Node 61 converts the product/data generated by the D20 Node 59 into a format that can be manually reviewed and adjusted by a human operator pre-authorized to make such modifications. This node may also utilize input received from the vendors bidding the project to properly sequence and schedule durations.

Node D22 is a Step-by-Step Place-by-Place Build Sequence and Exact Location Node referenced at box 58. The D22 Node 58 is preferably bifurcated in some embodiments, and may be considered a first of the central nodes or brains of the overall AUTOBUILD system. The D22 Node 58 establishes a three-dimensional or 3D control system within which the project is to be built and confirms that the elements of the facility are in the exact spatial location as required.

As the D22 Node 58 manages and oversees the placement of each element within the 3D environment, it is also communicating with the scheduling portions of the system, such as the D23 Node (Project Schedule Update node) referenced at box 62 in communication with the D22 Node 58 to confirm elements are being installed in proper sequential order as required. The D22 Node 58 further operates in conjunction with the G82 Node (Check Off and Control Notification/Alarm Sub/Supply Respond node) as at box 63 in communication therewith to maintain constant updates as to what the actual conditions are on the project site. If some aspect of the project is amiss, the G82 Node 63 sends out alerts that corrections are required.

The D23 Node as referenced at box 62 is essentially a Project Schedule Update node and the D24 Node as referenced at box 64 is a separate Schedule Update Node in communication with the D22 Node as at box 58. While the D23 Project Schedule Update Node 62 is in direct communication with the D22 Node, the D24 Schedule Update Node 64 flows from an onsite surveillance node denoted by the G84 Node otherwise denoted as a Project Video Camera Progress and Security Node and referenced at box 65. The D23 and D24 Nodes 62/64 work in a very similar manner by constantly measuring actual build progress and comparing the actual build progress to the planned project schedule.

The reader will note the D23 Node 62 primarily functions as a preliminary update node or module upstream or in upflow communication with the F52 Node described as a Contractual Commitment and Accountability System Node as referenced at box 66. The Contractual Commitments and Accountability System F52 Node 66 ensures the correct updated schedule information (best at the time) is implemented in the contracts with the vendors. The D24 Node 64 is placed within the revolving circle of actual on-site progress as updated by the G84 Node 65, and transmits scheduling information to the system governance nodules or brains that are constantly managing the sequence and accuracy of the work as exemplified by the B5, C10, D23, E41, F50, and G82 nodes. The overall AUTOBUILD system is complex and while each Module or Node plays a key role, each Module is believed to have a key operating/governing node exemplified by the B5, C10, D23, E41, F50, and G82 nodes.

The E40 Node as referenced at box 67 is a Vendor (Subcontractor and Supplier) Prequalification Application Node. The E40 Node 67 is the portal for all Vendors (Subcontractors and Suppliers) wishing to be part of and utilized within the overall AUTOBUILD system. Vendors are required by the AUTOBUILD system to provide a substantial amount of information in order to be prequalified and considered a resource to the AUTOBUILD system. The types of information required of Vendors will include, but not necessarily be limited to information pertaining to the products they provide/manufacture; the number of employees, financial strength, financial statements, production capability, raw material access, delivery capability, past performance, etc.

The E41 Node referenced at box 68 is a Subcontractor, Supplier Evaluation-Confirmation-Approval Node in communication with the E40 Node 67. The E41 Node 68 evaluates information received from the E40 Node 67 and rates each vendor based on the information provided such as products provided, number of employees, financial strength, financial statements, production capability, raw material access, delivery capability, and past performance as prefaced above. After a thorough investigation and evaluation, a comprehensive rating is sent to the E42 Node as referenced at box 69 in communication with the E41 Node 68 to be stored in a database made part of the E42 Node 69 and utilized as a resource for the AUTOBUILD system.

The E42 Node 69 is an Invitation to Prequalified Subcontractors and Suppliers Node in downflow communication with the E41 Node 68 as well as the C9 Node 50 and the D21 Node 61. The E42 Node 69 interprets information sent to it from the C9 Node 50 concerning products and quantities needed for the project along with schedule and sequence information provided by the D21 Node 61. The information received is compared against the information stored in the database for subcontractors and suppliers to utilize and to whom bid solicitations may then be sent. The E43 Node referenced at box 70 may be described as a Vendor Invitation to Bid Acceptance Node in communication with the E42 Node 69.

The bid invite/solicitations sent out by the E42 Node 69 contain initial information concerning product specifications along with associated quantities needed for the project and further sets forth preferred/required dates for product delivery and/or installation scheduling as governed by the D23 Node 62. This process allows the vendor to decide on whether to respond to the invitation to bid. The information format sent by the E42 Node 69 allows vendors to interpret and assess either manually by a human operator or by way of an automated system (e.g. via the AUTOBUILD system) with a subsequent response or answer to the invitation communicated back into the automated language of the AUTOBUILD system.

As prefaced above, the E43 Node 70 is a Vendor Invitation to Bid Acceptance query type Node in communication with the E42 Node 69. The E43 Node 70 is simplistic in design and manages those vendors indicating an interest in the project and indicating a commitment to respond to the invitation to bid. Once a vendor accepts the Invitation to Bid or ITB, the E43 Node 70 initiates a further transmission of the balance of detailed bid document information to responding vendor. Non-accepting vendors are eliminated from the system.

The E44 Node referenced at box 71 is a Send Final and Complete Bid Documents Node. The E44 Node 71 is a secondary brain according the present invention that assembles or compiles all final information concerning details of scope of work and required performance time and transmits this compiled information to all vendors that have accepted the bid invitation. The bid documents sent out by the E44 Node 71 comprise final detailed information concerning product specifications along with their associated quantities needed for the project and sets forth required dates for delivery and installation scheduling governed by the D23 Node 62 as the system advances the project forward toward a finished product 20.

The information formatting sent by the E44 Node 71 allows vendors to interpret and assess and respond to the information sent either manually by way of a human operator or by way of the automated AUTOBUILD system. The vendors are provided with AUTOBUILD system formats that the vendors can input in their own respective customized response data centers with parameters in order to automate vendor pricing for the line items in bidding and for confirmations that the individual vendors can meet the required completion time on the project. If elected by the individual or select vendors, the E44 Node 71 operates similarly as compared to the C10 Node 51. In this regard, it will be recalled the C10 Node 51 can be easily utilized within the F50 Node 60 to evaluate the vendor bids being received.

The E45 Node as at box 72 is a Final Bid Submission by Vendors Node. The E45 Node 72 allows a vendor to transmit its bid response which can be done manually if it conforms to the AUTOBUILD system or in an automated manner that is communicated through the format provided by the AUTOBUILD system. A final bid submission will be required by the vendor(s) and managed by this node to confirm the vendor commitment(s) to meet the delivery date for its portion of the project.

The reader will note that the E45 Node 72, to some extent, lies outside of the central AUTOBUILD system as it is controlled by the vendor with its own response data and parameters. This node information can then be used in the F50 Node 60 in communication with the E45 Node 72 to be evaluated. When approved the vendor will be notified by the F52 Node 66 and contracted to begin to manufacture, deliver, and or build its line item of the project. The reader will note the E45 Node 72 is also in communication with the 200 Node as at box 73. The AUTOBUILD 200 Node provides additional software-based functionality that can be utilized and customized to automate the vendor's production of its work as discussed in more detail later below.

The F50 Node 60 is an Evaluation of Bids and Project Delivery Time Node. The F50 Node 60 gathers all information, contract requirements, and bids received, and evaluates, in a chronological order, the lowest responsible bidder that can also meet the scheduled time of completion for its line item. For each line item, this node ranks in order of the best bid received and provides a listing of criteria with exemplary indicators (e.g. plusses and minuses) for each bidder in a sequential manner as it goes down the listing of criteria.

The F50 Node 60 further functions to consider and compare the information provided by the C10 Node 51 to help assess whether the bids provided are within certain parameters or are close to anticipated bid expectations. Should the total cost exceed owner/customer expectations and budget, the F50 Node 60 allows for adjustment and value engineering input to be implemented for selected line items to be then rebid developing a new adjusted total cost for the project.

The F51 Node is a Manual Review and Matrix of Vendor Selection Node referenced at box 74 in communication with the F50 Node 60. The F51 Node 74 allows the collaboration and independent review of a human operator to confirm which bid the owner/customer 10 wishes to utilize as the lowest responsible bidder from the vendor selection otherwise provided by the AUTOBUILD system according to the presently disclosed subject matter. The F51 Node 60 thereby provides an important check and balance for the AUTOBUILD system. The F51 Node 74 is the last modular step before entering into contractual commitments with the vendor(s) and establishing project costs.

As prefaced above, the F52 Node 66 is a Contractual Commitment and Accountability System Node at which node contract agreements are populated in communication with the F51 Node 74 and the D23 Node 62 as well as a Verify Exact Location of Install Node G85 as at box 75 and a Quality Verification Node G86 as at box 76 as respectively discussed in more detail below. The F52 Node 66 essentially confirms in written detail the scope of work to be provided along with performance criteria including schedule requirements and drafts/provides a legal contract document to be approved and executed by the vendors.

As previously referenced, the Site Evaluation and Existing Conditions G80 Node 22 is in communication with the B5 Node 15 as an entry point for inputting existing knowledge, data and documents depicting current site conditions along with GPS and camera monitoring systems to evaluate site conditions needed to be considered for the construction of the project. In this regard, the G80 Node 22 is a hybrid type of node and has A Module or A Node characteristics at least insofar as it provides site assessment functionality for setting up the AUTOBUILD system to operate smoothly as it feeds the B5 Node 15 with site information. In some embodiments, the G80 Node 22 is also in communication with the G85 Node as at box 75 and assists in monitoring all types of site conditions such as existing structures on the site, existing utilities, topographic elevations of the site, water flow and sheeting across the site, locations of existing curbs, paving, and other traffic rights-of-way, etc. The G80 Node 22 is utilized in the planning of the project, determination of scope, and coordinating project site logistics.

In some embodiments, the G80 Node 22 may also be in indirect communication with an Establishment of Project Control Points and GPS Node as at Node G81 or box 77 for more properly developing all project control points, and is basically a utility in establishing and setting all control points and GPS locations for the project. The G81 Node 77 also inputs into the D22 Node 58 that requires this information to accurately place and coordinate all elements of the project.

Node G82 as referenced at box 63 is a Work in Place Check Off System-Control, Confirmation, Notification, Alarm, and Vendor Response Node. The G82 Node 63 is another important element that works closely in conjunction with the D22 Node 58 and the circular system of monitoring the actual work progress on site. The G82 Node 63 comprises all the required information and data for precisely coordinating and managing all building elements as they are assembled from the standpoint of verifying the products are (a) per specification, (b) positioned in the correct location(s), (c) assembled in the correct sequence, (d) connecting two adjacent products correctly, (e) meeting the project schedule, etc.

When the G82 Node 63 detects a product problem (i.e. when something is amiss or not meeting the contractual requirements) notification(s) and/or alert(s) are sent out to the appropriate parties to make adjustments and corrections. For serious and urgent issues that have a major impact on the project or safety to people and the environment, a more robust alarm will be triggered to better communicate a sense of urgency. The G82 Node 63 utilizes, communicates, and coordinates with other nodes that form the physical monitoring and tracking system of the actual project status or current work flow.

The G83 Node as at box 78 is a Vendor Robot Interceptor and Robot Action Node. The G83 Node 78 operates from both within the software-based components of the AUTOBUILD system and also within software that may already be carried or implemented by vendors involved with the project. The G83 Node 78 is basically the communication system that informs and directs human laborers, mechanical equipment, and robots to carry out the work required in the appropriate sequence, in the correct location, and at the correct time. The G83 Node 78 further has the capability to communicate back to appropriate nodal functions that are needed for collaboration of physical actions so that on-site work advances properly.

The G84 Node as at box 65 is a Live Video Progress and Security surveillance Node. The G84 Node 65 coordinates live video through fixed cameras and drones and other sensors that are tied into GPS systems to track progress visually and materially in real-time at the project site. The G84 Nodes 65 provides the eyes, ears, and fingers of the AUTOBUILD system that functions similarly to a human operator or superintendent in visualizing, inspecting, confirming, even touching and feeling elements of the project to ensure timely compliance with an ability to communication directly or indirectly with other support nodes to keep the circular system flowing toward progress. The G84 Node 65 is preferably further equipped with sensors to detect temperature, moisture, density, etc. so as to help monitor, confirm, and communicate necessary information and data to appropriate peripheral support nodes within the AUTOBUILD system.

The G85 Node as at box 75 is a Verification of Install Location Node. The G85 Node 75 is preferably in indirect communication with the G80 Node 22 and in direct communication with the G84 Node 65 and in further communication with the F52 Node 66 in some embodiments. The G85 Node 75 thus interacts with the G82, G84 and F52 Nodes to confirm and coordinate all elements of the project as they are being installed in the exact location required utilizing GPS systems along with the data giving direction for the correct installation.

The G86 Node 76 is a Quality Verification Node. The G86 Node 76 is basically an extension of the G84 Node 65 in communication therewith and further interacts with the G83, G84, and F52 Nodes 78/65/66 to confirm all products being installed precisely meet the project specifications. The G86 Nodes 76 utilizes equipment that monitors assembly aspects such as temperature, moisture, density, connections, adhesives, GPS locations, etc. and compares this information with project requirements that have been designed and specified in the contract documents.

The H100 Node as at box 79 is an Accounts Receivable (AR) and Accounts Payable (AP) Accounting Systems. The H100 Node 79 is in communication with the F52 Node 66 and receives information from the D24, G82, G85, and G86 Nodes, which information is then be compared to the contractual commitments and financial arrangements set out in the F52 Node 66. After verifying progress in terms of meeting schedule requirements, quality requirements, and percentage of completion, a payment voucher is generated to be approved by a check and balance system. This check and balance system is preferably collaborated and adjusted by a human operator approved to enter, review, and make corrections. After final approvals have been agreed to by the vendor, contractor, and owner/customer, a payment will be made in a multitude of optional vehicles such as wire transfers, electronic checks, physical checks, etc. The H100 Node 79 operates and functions in the same manner as a traditional company's financial department and thus maintains all records in order as required to receive and make payments, track individual and overall percent completes, PandL projections, tax accounting, etc.

Node 200 as at box 73 is an AUTOBUILD for Vendors System. The AUTOBUILD for Vendors System Node 200 or box 73 is an additional software-based system that operates similarly as compared to the AUTOBUILD system, but is customized and adjusted to operate for the benefit of all vendors working in their unique way to conform for bringing products and services into the AUTOBUILD system. The construction project management system according to the present invention thus contemplates a vendor system as at Node 200, substantially similar to the AUTOBUILD system and is thus built upon non-transitory, computer-implementable modules for enhancing vendor contributions thereto.

Although the AUTOBUILD for Vendors System Node 200 as at box 73 is not essential to the practice of the present invention, if included the Node 200 may well assist in vendor operation and facilities to bid, communicate, procure, fabricate, and deliver products to the jobsite in an automated manner otherwise being uniformly orchestrated within the AUTOBUILD system. The AUTOBUILD for Vendors System Node 200 is thus a slightly modified version of the AUTOBUILD operating system according to the presently disclosed subject matter.

In the preferred systemic embodiment according to the present specifications, it is contemplated the AUTOBUILD system is built to operate in a computer-populated environment. Components interact with the AUTOBUILD operating system by way of one or more computing devices/clients. The AUTOBUILD operating system according to the presently disclosed subject matter basically provides a computer-implemented, multi-modular, software-based construction project management system/platform for facilitating automated and comprehensive construction project management from design to build completion stages.

FIG. 6 illustrates how the System Conversion, Data Entry and Analytics B5 Node 15 fits within the whole system of a comprehensive, detailed, safe, reliable network of functions that ultimately deliver a physically built/assembled project. The competency of the System Conversion, Data Entry and Analytics B5 Node 15 it is of upmost criticality due to its primary role of preparing accurate and categorical information to be disseminated and used throughout so many critical portions of the complexities in building/assembling even complex projects. These critical activities that rely almost exclusively on the System Conversion, Data Entry and Analytics B5 Node 15 in general are systems that provide but are not limited to: quantifications, material and component competencies, connection details, labor productions and equipment needs, cost estimates, bid solicitations and evaluations, project scheduling, procurement, contracting controls, financial accounting, project assembly, controls, monitoring, quality control etc.

While the above descriptions contain much specificity, this specificity should not be construed as limitations on the scope of the presently disclosed subject matter, but rather as an exemplification of the invention. The foregoing specifications are contemplated to essentially provide a data entry and analytics system for enabling design input management and to allow for automated construction processes. While the flowcharting submitted in support of these specifications generally depict communications between adjacent nodes, this should not be construed as limiting. Unidirectional communications may also be possible in certain instances.

The presently disclosed subject matter essentially provides a system that can take an electronic project design and decipher the information as to detail what information is directed to elements, what information is directed to specific materials, what information is involved with connecting the materials, what information provides the quality of the elements, and what information determines where in an XYZ coordinate system each element is to be positioned. In short, all things that are required to complete the full comprehensive process are deciphered.

According to another aspect of the presently disclosed subject matter, a system is provided that receives electronic project design data and determines its competency. In other words, the presently disclosed subject matter first determines whether a design comprehensive and competent. The system queries whether the elements are connected properly; whether the project design is safe to build; whether the elements involved with the project compatible with the environment of the project; and whether there any errors or inconsistencies in the design. In other words, the system receives an electronic design of a project, and fully vets the project design thereby ensuring its competency down to its finest details. If the project design appears to be out of compliance or contains errors or inconsistencies, the system provides a mechanism for sending alerts and allowing for adjustments if required. The system may also make suggestions on those areas of concern or requiring correction, which suggestions may then be separately made available for outside approval.

It is to be further noted the system has its own built-in intellect made more robust by communicating with outside systems. In this regard, it is configured to have a self-evolving intellect as described in the definitions beginning at the detailed description of the preferred embodiment, re-presented hereinafter for the reader's quick reconsideration:

"Initial Intellect Input": intellect that has been built into the system from this author, this author's resources, standard business practices, standard building practices, standard engineering and design standards, and deep comprehensive long-term experience in the industry "Self-Evolving Intellect" "Initial Intellect Input" along with AI and other industry advancements moving forward.

The system according to the presently disclosed subject matter is operable to establish an optimal assembly/erection procedure and its mechanics. In other words, the system is operable to establish the optimal sequence of assembly and is configured to establish within itself confirmation controls and procedures. The system receives electronic design information and converts it into a fully comprehensive and complete detailed line item estimate format for the full comprehensive physical project desire to build.

The system is comprehensive, and that has its own self evolving intellect to produce information that can be communicated to all other types of procedures and tasks that need to be accomplished to complete a fully competent project and all required parts down to the final delivery and use of the product/building/project. These systems include, but are not limited to quantifying elements, estimating, soliciting bids, scheduling, bid, evaluations, contracting, procurement, physical, automated assembly/build of the project, what tools and equipment are required, project measures and oversight, financial accounting, safety, compliance, etc.

The system receives and electronic design and manages, through its intellect, existing and future developments in the automation of construction. In other words, the system is configured to enable self-driving excavation, delivery vehicles, self-driving equipment, robotic drywall hangers, robotic masons, robotic plumbers, drones, etc. The system is configured to manage any robot assembly aspect of the build project. The system receives design information and deciphers, organizes and formulates a communication system in such a way that can then communicate to all devices needing to complete the physical construction, such as robots, drones, autonomous vehicles and equipment, computerized, machinery, etc.

To achieve these primary objectives, the presently disclosed subject matter provides a data entry and analytics system and method for vetting digital project design data and support construction automation processes. The data entry and analytics system comprises a computer network configured to implement non-transitory, computer-implementable, software-based components and allow communication between computers within the computer network.

The system comprises a centralized data entry and analytics component configured to: receive the digital project design data for a project design from at least one upstream source; analyze the digital project design data to determine whether said data competently supports a complete construction of the project design in an automated manner; provide a mechanism for updating the digital project design data so as to ensure said data competently supports the project design and an automated complete construction thereof, and transmit the digital project design data to downstream components for enabling and competently supporting completion of the project design and the automated complete construction thereof.

In some embodiments, the data entry and analytics component is compartmentalized into a block components, the block components being in communication with one another within the centralized data entry and analytics component. In some embodiments, the block components comprise self-evolving intellect. In some embodiments, the centralized data entry and analytics component comprises a data decipher block component configured to decipher build elements, build materials, build connections, build qualities, and build coordinates from the digital project design data to compile a deciphered data profile.

In some embodiments, the deciphered data profile is accessible to all block components within the within the centralized data entry and analytics component. In some embodiments, the centralized data entry and analytics component comprises a data compliance block component configured to: analyze the deciphered data profile to determine whether said profile competently supports the automated complete construction of the project design; and update the deciphered data profile so as to ensure said profile competently supports the project design and the automated complete construction thereof.

In some embodiments, the data compliance block comprises a plurality of reference data sets all of which further comprise self-evolving intellect to fully vet project information related to the project design on an ongoing basis. In some embodiments, the centralized data entry and analytics component comprises an establish functions block component configured to establish optimal assembly mechanics, establish optimal assembly sequencing, and establish confirmation controls and procedures. In some embodiments, the establish functions block component cycles data from the data compliance block component to the data decipher block.

In some embodiments, the centralized data entry and analytics component comprises a line-item estimates format block component configured to organize line-item estimates formatting. In some embodiments, the line-item estimates format block component is in communication with both the data decipher block component and the establish functions block component. While summarized systemically above, the data entry and analytics method according to the presently disclosed subject matter is substantially similar to the system.

Accordingly, although the data entry and analytics system and method according to the presently disclosed subject matter has been described by reference to a number of different features and aspects, it is not intended that the novel descriptions and systemic interactions thereof be limited thereby, but that modifications thereof are intended to be included as falling within the broad scope and spirit of the foregoing disclosure, the appended drawings, and the following claims.

What is claimed is:

1. A computer-implemented data entry and analytics system configured to receive and vet digital project design data and support construction automation processes, the computer-implemented data entry and analytics system comprising:
a computer network comprising a plurality of computers configured to implement non-transitory, computer-implementable, software-based components allowing communication between the plurality of computers within the computer network, the non-transitory, computer-implementable, software-based components comprising a centralized data entry and analytics component;
the centralized data entry and analytics component being compartmentalized into a plurality of block components, the plurality of block components being in communication with one another and comprising self-evolving intellect defined by an initial intellect input evolved through an artificial intelligence process;
the centralized data entry and analytics component comprising a data decipher block component configured to decipher at least build materials, build connections, build qualities, and build coordinates from the digital project design data to compile a deciphered data profile;
the centralized data entry and analytics component being configured to:
receive the digital project design data for a project design from at least one upstream source;
analyze internally the digital project design data to determine whether said digital project design data supports a complete construction of the project design in an automated manner;
alert a user if corrections are required for supporting the complete construction of the project design;
update the digital project design data internally as necessary so as to ensure said digital project design data supports the project design and an automated complete construction thereof; and
communicate the digital project design data as vetted and updated as necessary to downstream components for enabling and supporting completion of the project design and the automated complete construction thereof.

2. The data entry and analytics system according to claim 1, wherein the centralized data entry and analytics component is configured to convert the digital project design data into a standardized data format that enables peripheral downstream components in networked, inter-communication with the centralized data entry and analytics component to perform automated peripheral component functions for enabling and supporting completion of the project design and the automated complete construction thereof.

3. The data entry and analytics system according to claim 1, wherein the deciphered data profile is accessible to all block components within the centralized data entry and analytics component.

4. The data entry and analytics system according to claim 1, wherein the centralized data entry and analytics component comprises a data compliance block component configured to:
analyze the deciphered data profile to determine whether said deciphered data profile supports the automated complete construction of the project design; and
update the deciphered data profile so as to ensure said deciphered data profile supports the project design and the automated complete construction thereof.

5. The data entry and analytics system according to claim 4, wherein the data compliance block component comprises a plurality of reference data sets all of which further comprise the self-evolving intellect to fully vet project information related to the project design on an ongoing basis.

6. The data entry and analytics system according to claim 4, wherein the centralized data entry and analytics component comprises an establish functions block component configured to establish optimal assembly mechanics, establish optimal assembly sequencing, and establish confirmation controls and procedures.

7. The data entry and analytics system according to claim 6, wherein the establish functions block component cycles data from the data compliance block component to the data decipher block component.

8. The data entry and analytics system according to claim 6, wherein the centralized data entry and analytics component comprises a line-item estimates format block component configured to organize line-item estimates formatting.

9. The data entry and analytics system according to claim 8, wherein the line-item estimates format block component is in communication with both the data decipher block component and the establish functions block component.

10. A data entry and analytics method for vetting digital project design data and supporting construction automation processes, the data entry and analytics method comprising the steps of:
connecting to a computer network configured to implement non-transitory, computer-implementable, software-based components allowing communication between computers within the computer network, the non-transitory, computer-implementable, software-based components comprising centralized data entry and analytics component;
the centralized data entry and analytics component being compartmentalized into a plurality of block components, the plurality of block components being in communication with one another and comprising self-evolving intellect defined by an initial intellect input evolved through an artificial intelligence process;
the centralized data entry and analytics component comprising a data decipher block component configured to decipher at least build materials, build connections, build qualities, and build coordinates from the digital project design data to compile a deciphered data profile;
the centralized data entry and analytics component being configured to:
receive the digital project design data for a project design from at least one upstream source;

analyze internally the digital project design data to determine whether said digital project design data supports an automated complete construction of the project design;

alert a user if corrections are required for supporting the complete construction of the project design;

update the digital project design data internally as necessary so as to ensure said digital project design data supports the project design and the automated complete construction thereof; and communicate the digital project design data as vetted and updated as necessary to downstream components for enabling and supporting completion of the project design and the automated complete construction thereof.

11. The data entry and analytics method according to claim 10 wherein the centralized data entry and analytics component is configured to convert the digital project design data into a standardized data format that enables peripheral downstream components in networked, inter-communication with the centralized data entry and analytics component to perform automated peripheral component functions for enabling and supporting completion of the project design and the automated complete construction thereof.

12. The data entry and analytics method according to claim 10, wherein the deciphered data profile is accessible to all block components within the centralized data entry and analytics component.

13. The data entry and analytics method according to claim 10, wherein the centralized data entry and analytics component comprises a data compliance block component configured to:

analyze the deciphered data profile to determine whether said deciphered data profile supports an automated complete construction of the project design; and update the deciphered data profile so as to ensure said deciphered data profile supports the project design and the automated complete construction thereof.

14. The data entry and analytics method according to claim 13, wherein the data compliance block component comprises a plurality of reference data sets all of which further comprise the self-evolving intellect to fully vet project information related to the project design on an ongoing basis.

15. The data entry and analytics method according to claim 13, wherein the centralized data entry and analytics component comprises an establish functions block component configured to establish optimal assembly mechanics, establish optimal assembly sequencing, and establish confirmation controls and procedures.

16. The data entry and analytics method according to claim 15, wherein the establish functions block component cycles data from the data compliance block component to the data decipher block component.

17. The data entry and analytics method according to claim 15, wherein the centralized data entry and analytics component comprises a line-item estimates format block component configured to organize line-item estimates formatting.

18. The data entry and analytics method according to claim 17, wherein the line-item estimates format block component is in communication with both the data decipher block component and the establish functions block component.

19. A computer-implemented data conversion, data entry and analytics system, the computer-implemented data conversion, data entry and analytics system comprising:

a plurality of non-transitory, computer-implementable, software-based components made operable via at least one computer, the plurality of non-transitory, computer-implementable, software-based components including a compartmentalized centralized data entry and analytics component;

the compartmentalized centralized data entry and analytics component comprising a plurality of block components in communication with one another, the plurality of block components comprising self-evolving intellect defined by an initial intellect input evolved through an artificial intelligence process;

the plurality of block components including a data decipher block component configured to decipher at least build materials, build connections, build qualities, and build coordinates to compile a deciphered data profile;

the centralized data entry and analytics component being configured to:

receive digital project design data for a project design from at least one upstream source;

vet the digital project design data to provide vetted digital project design data by:

internally analyzing the digital project design data to determine whether said digital project design data supports a complete construction of the project design in an automated manner;

alerting a user if corrections are required for supporting the complete construction of the project design;

internally updating the digital project design data as necessary so as to ensure said digital project design data supports the project design and an automated complete construction thereof; and provide a uniform language system based on the vetted digital project design data to be used by peripheral downstream components to communicate in a common format a direction to properly build the project design.

* * * * *